US012632533B2

(12) United States Patent
Kuroda

(10) Patent No.: US 12,632,533 B2
(45) Date of Patent: May 19, 2026

(54) INFORMATION PROCESSING APPARATUS, INFORMATION PROCESSING SYSTEM, INFORMATION PROCESSING METHOD, AND COMPUTER-READABLE RECORDING MEDIUM

(71) Applicant: NEC Corporation, Tokyo (JP)

(72) Inventor: Takayuki Kuroda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 45 days.

(21) Appl. No.: 18/428,204

(22) Filed: Jan. 31, 2024

(65) Prior Publication Data

US 2024/0281516 A1 Aug. 22, 2024

(30) Foreign Application Priority Data

Feb. 16, 2023 (JP) ................................. 2023-022100

(51) Int. Cl.
*G06F 21/00* (2013.01)
*G06F 21/44* (2013.01)
(52) U.S. Cl.
CPC .................................... *G06F 21/44* (2013.01)
(58) Field of Classification Search
CPC ....................................................... G06F 21/44
See application file for complete search history.

(56) References Cited

U.S. PATENT DOCUMENTS

| | | | |
|---|---|---|---|
| 11,316,941 B1 * | 4/2022 | Jain ...................... | H04L 41/0816 |
| 2017/0277754 A1 * | 9/2017 | Terao .................. | G06F 16/2379 |
| 2021/0306237 A1 * | 9/2021 | Yakuwa .................... | G06F 8/20 |

FOREIGN PATENT DOCUMENTS

WO 2019/216082 A1 11/2019

OTHER PUBLICATIONS

Takayuki Kuroda, Takuya Kuwahara, Takashi Maruyama, Yutaka Yakuwa, Kazuki Tanabe, Tatsuya Fukuda, Kozo Satoda, and Takao Osaki "Acquisition of Knowledge about ICT System Designing with Machine Learning", IEICE Transactions B vol. J104-B No. 3 pp. 140-151, Mar. 1, 2021 with its English machine translation.

* cited by examiner

*Primary Examiner* — Rodman Alexander Mahmoudi
(74) *Attorney, Agent, or Firm* — Sughrue Mion, PLLC

(57) ABSTRACT

An information processing apparatus including: an acquiring unit that acquires target system requirement information among system requirements related to an information communication system to be designed, which is configured across a plurality of authority ranges; a first generating unit that generates first system configuration information belonging to a first authority range from the first system requirement information belonging to the first authority range based on the target system requirement information; a requesting unit that requests another information processing device to generate second system configuration information based on second system requirement information belonging to a second authority range among the target system requirement information; a second generating unit that generates target system configuration information corresponding to the target system requirement information based on the first system configuration information and the second system configuration information; and an output control unit that outputs the target system configuration information to an output device.

10 Claims, 32 Drawing Sheets

Fig.4
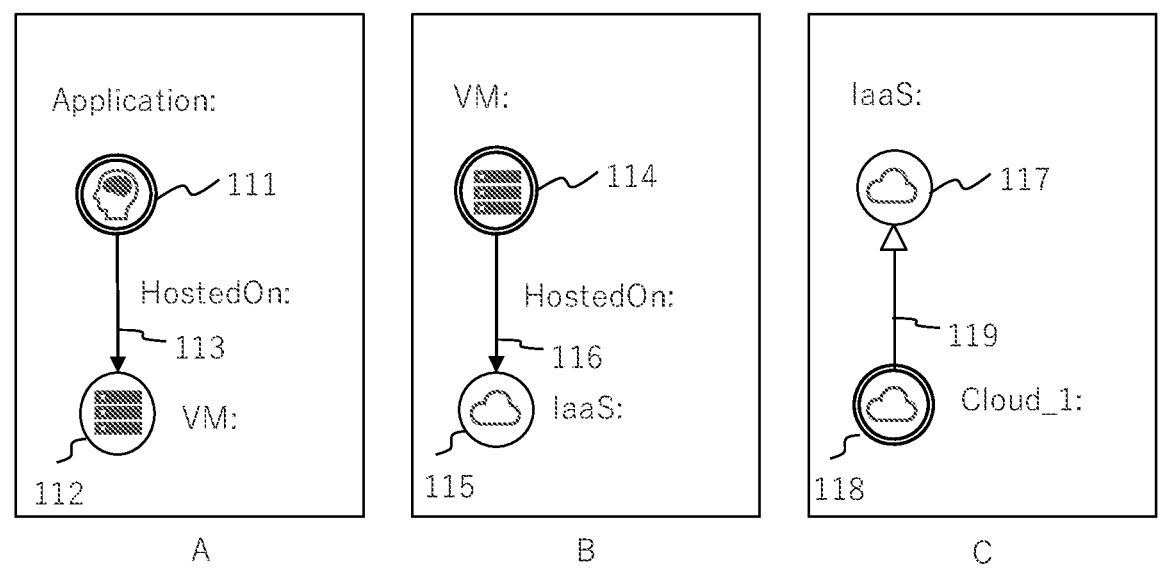
A          B          C
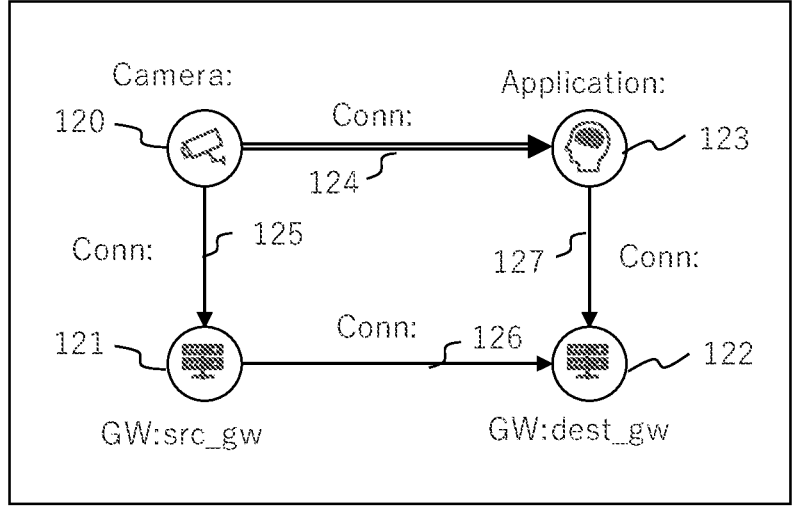
D

Figure 5:
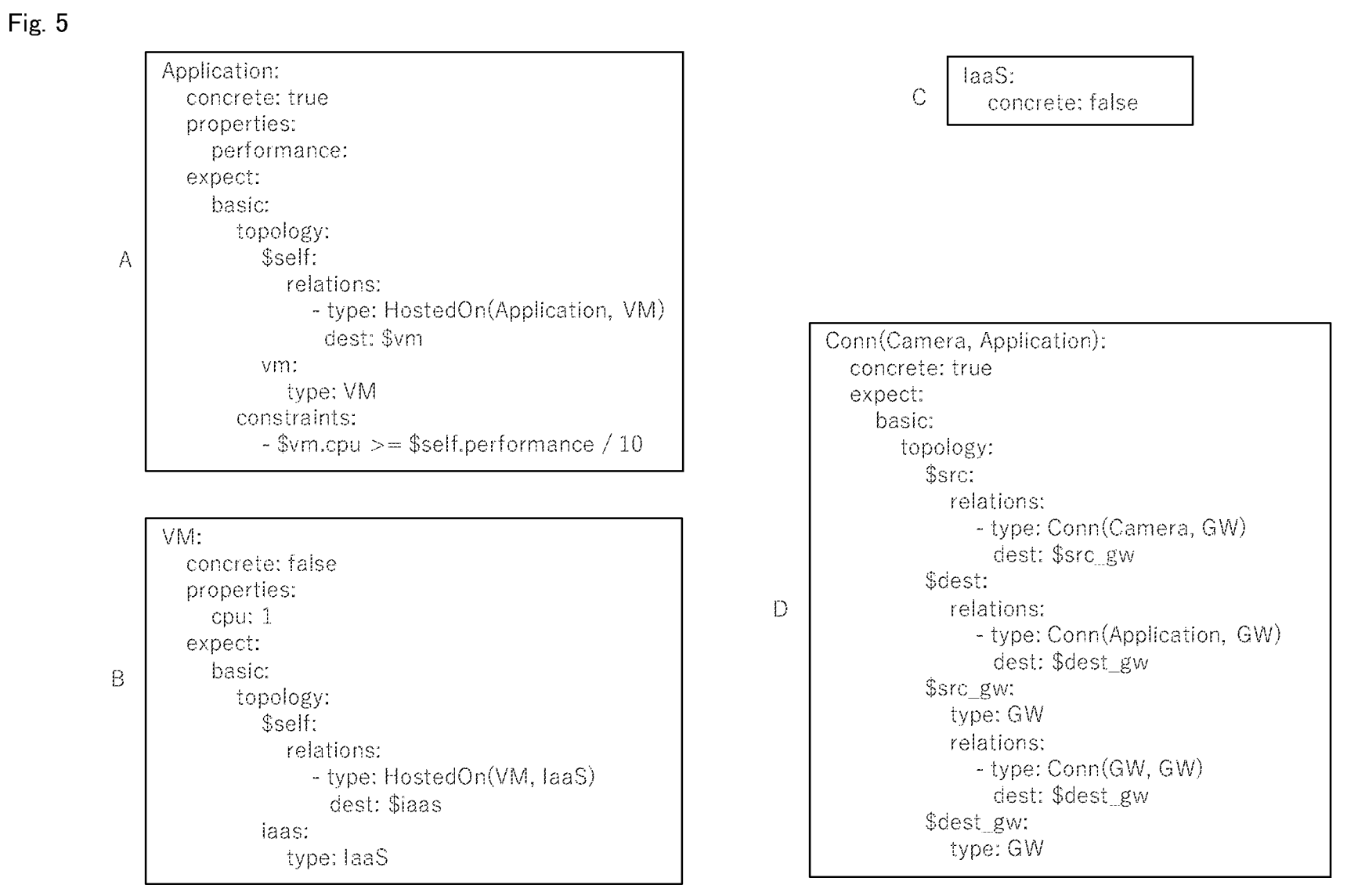

```
Application:
  concrete: true
  properties:
    performance:
  expect:
    basic:
      topology:
        $self:
          relations:
            - type: HostedOn(Application, VM)
              dest: $vm
        vm:
          type: VM
      constraints:
        - $vm.cpu >= $self.performance / 10
```

B

```
VM:
  concrete: false
  properties:
    cpu: 1
  expect:
    basic:
      topology:
        $self:
          relations:
            - type: HostedOn(VM, IaaS)
              dest: $iaas
        iaas:
          type: IaaS
```

C

```
IaaS:
  concrete: false
```

D

```
Conn(Camera, Application):
  concrete: true
  expect:
    basic:
      topology:
        $src:
          relations:
            - type: Conn(Camera, GW)
              dest: $src_gw
        $dest:
          relations:
            - type: Conn(Application, GW)
              dest: $dest_gw
        $src_gw:
          type: GW
          relations:
            - type: Conn(GW, GW)
              dest: $dest_gw
        $dest_gw:
          type: GW
```

Fig.6

```
Cloud_1:
    derived_from: IaaS
    concrete: true
```

```
Cloud_1_VM:
    derived_from: VM
    concrete: true
    expect:
        basic:
            topology:
                iaas:
                    type: Cloud_1
            constraints:
                - $self.cpu <= 5
```

```
domain_models:
   - domain_name: Cloud_1
     interface_component:
        type: Cloud_1
        url: http://cloud1.example.com/
     component_types:
        Cloud_1: <OMITTED>
        Cloud_1_VM: <OMITTED>
        Cloud_1_ VN: <OMITTED>
        Cloud_1_ LGW: <OMITTED>
     relation_types:
        Cloud_1_ JoinIn(VM, VN): <OMITTED>
        Cloud_1_ Conn(VN, GW): <OMITTED>
     constraints: <OMITTED>
   - <OMITTED>
```

Cloud_1:

A                                                    B

A

```
intent:
    topology:
        c1:
            type: Camera
            properties:
                quality: 100
            relations:
                - type: Conn(Camera, Application)
                  dest: $a1
                - type: JoinIn(Camera, Site)
                  dest: $b1
        a1:
            type: Application
            properties:
                performance: 30
            relations:
                - type: JoinIn(Application, IaaS)
                  dest: $p1
        b1:
            type: Site
        p1:
            type: IaaS
```

Figure 11:
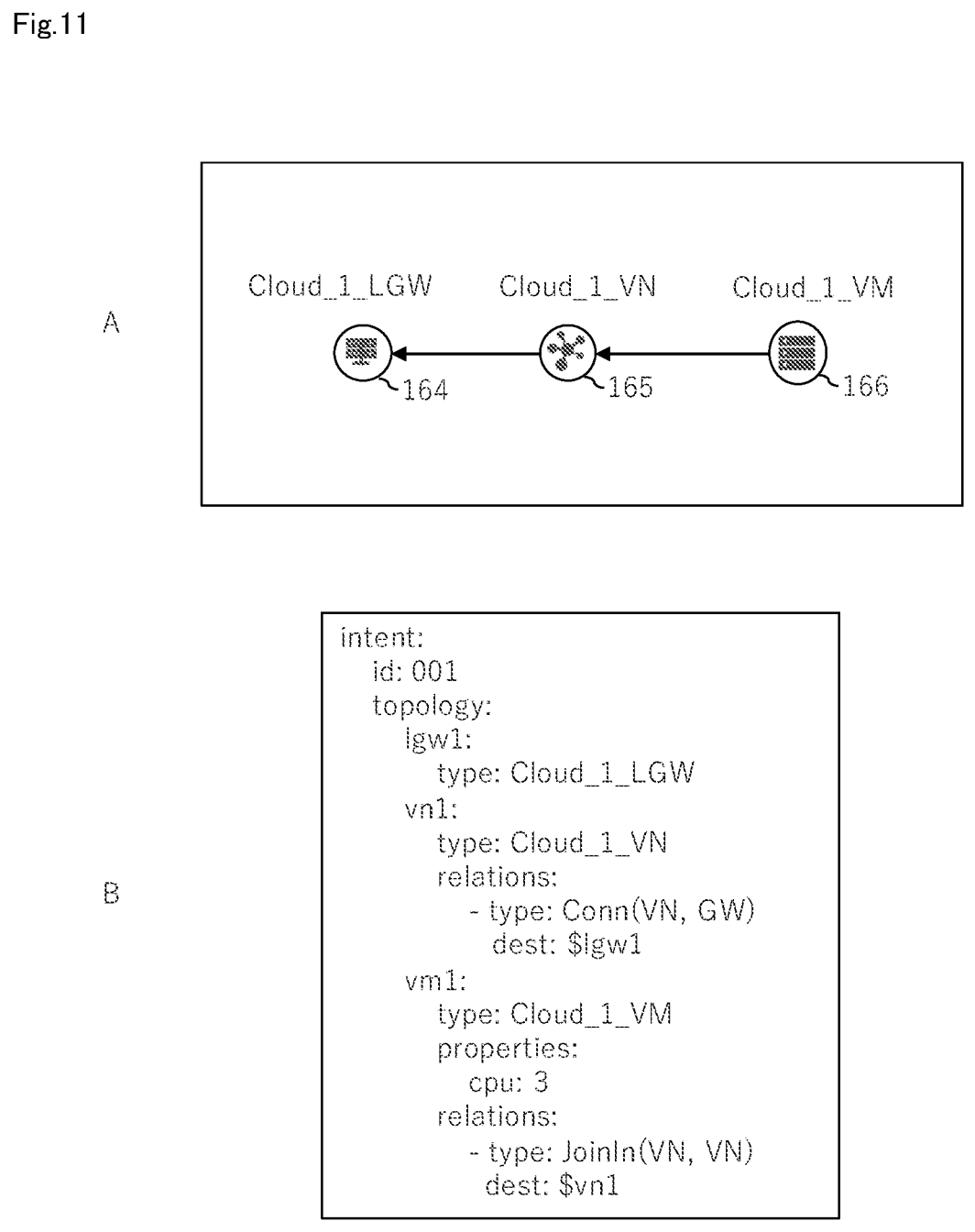

```
intent:
    id: 001
    topology:
        lgw1:
            type: Cloud_1_LGW
        vn1:
            type: Cloud_1_VN
            relations:
                - type: Conn(VN, GW)
                  dest: $lgw1
        vm1:
            type: Cloud_1_VM
            properties:
                cpu: 3
            relations:
                - type: JoinIn(VN, VN)
                  dest: $vn1
```

Fig.12

```
intents:
  - id: 001
    topology:
      lgw1-001:
        type: Cloud_1_LGW
      vn1-001:
        type: Cloud_1_VN
        relations:
          - type: Conn(VN, GW)
            dest: $lgw1-001
      vm1-001:
        type: Cloud_1_VM
        properties:
          cpu: 3
        relations:
          - type: JoinIn(VN, VN)
            dest: $vn1-001
  - id: Cloud_1
    topology:
    constraints:
      - every(PM, $_.cpu <= 5)
```

Fig.13

```
Cloud_1_VM:
    derived_from: VM
    concrete: true
    expect:
        basic:
            topology:
                $self:
                    relations:
                        - type: HostedOn
                          dest: $pm
                pm:
                    type: PM
            constraints:
                - $self.cpu <= 5
```

Vlan:

163

:node1    :node2

181    182

183

:node3

A

```
intents:
  - id: 002
    topology:
      vlan-002:
        type: Vlan
        properties:
          src_gw: xx.xx.xx.xx
          dest_gw: yy.yy.yy.yy
  - id: ns2
    topology:
      node1-ns2:
        type: NS_2_Node
        relations:
          - type: Conn
            dest: $node2
      node2-ns2:
        type: NS_2_Node
      node3-ns2:
        type: NS_2_Node
        relations:
          - type: Conn
            dest: $node1
          - type: Conn
            dest: $node2
```

```
intent_id: 001
result: ok
topology:
    lgw1:
        type: Cloud_1_LGW
    vn1:
        type: Cloud_1_VN
        relations:
            - type: Conn(VN, GW)
              dest: $lgw1
    vm1:
        type: Cloud_1_VM
        properties:
            cpu: 3
        relations:
            - type: JoinIn(VN, VN)
              dest: $vn1
component_types:
    Cloud_1_VM:
        constraints:
            - $self.cpu <= 5
```

```
intents:
   - id: 001
     topology:
        lgw1-001: <OMITTED>
        vn1-001: <OMITTED>
        vm1-001: <OMITTED>
   - <OMITTED>
history:
   - eid: vm1-001
     rule_id: Cloud_1_VM_basic
     map:
     new_map:
        iaas:
           eid: iaas_01-001
           type: Cloud_1
   - <OMITTED>
instance:
   topology:
      lgw1-001:
         <OMITTED>
         state: running
      vn1-001:
         <OMITTED>
         state: running
      vm1-002:
         <OMITTED>
         state: running
```

Fig. 24

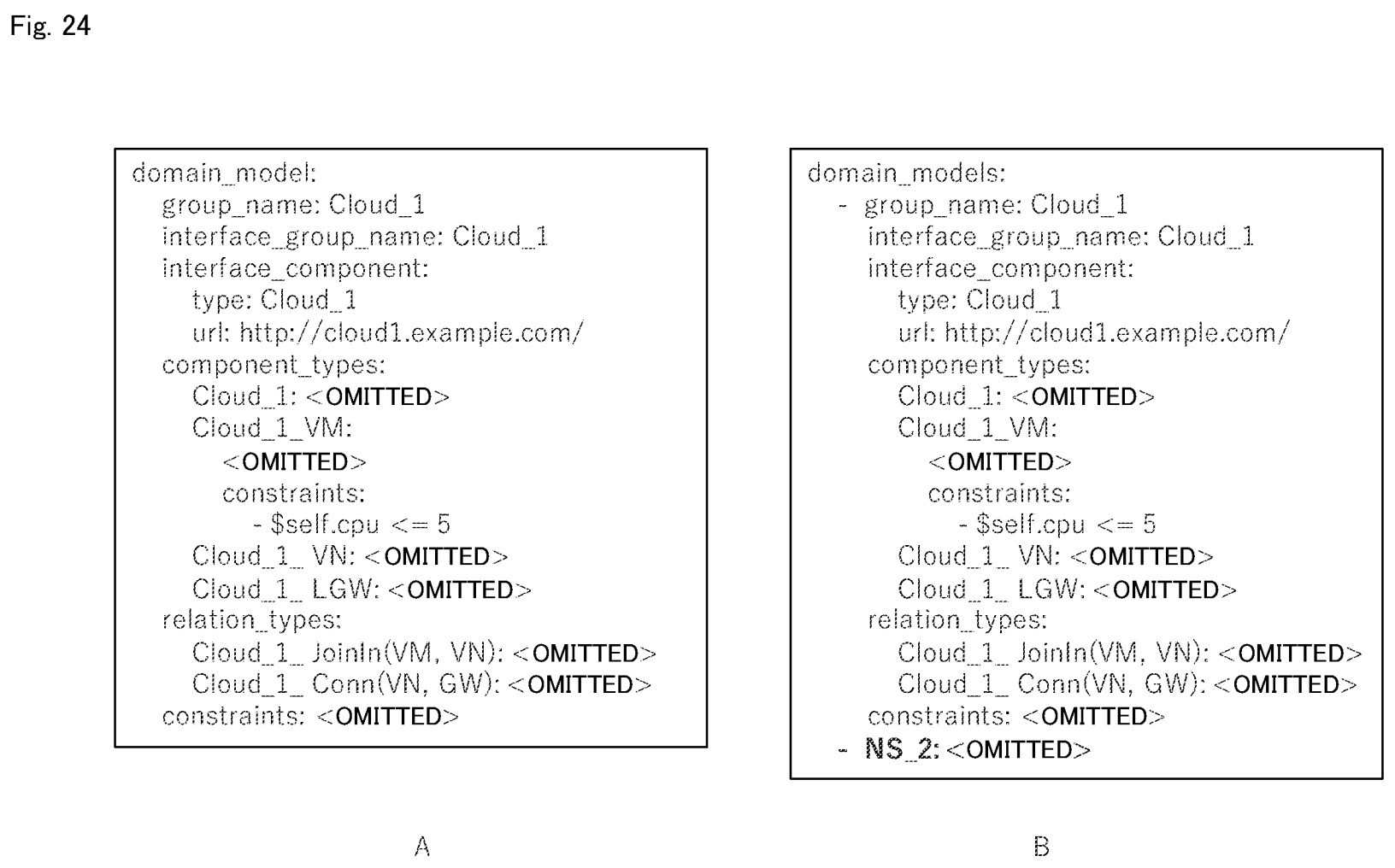

```
domain_models:
  - group_name: Cloud_1
    interface_group_name: Cloud_1
    interface_component:
      type: Cloud_1
      url: http://cloud1.example.com/
    component_types:
      Cloud_1: <OMITTED>
      Cloud_1_VM:
        <OMITTED>
        constraints:
          - $self.cpu <= 5
      Cloud_1_VN: <OMITTED>
      Cloud_1_LGW: <OMITTED>
    relation_types:
      Cloud_1_JoinIn(VM, VN): <OMITTED>
      Cloud_1_Conn(VN, GW): <OMITTED>
    constraints: <OMITTED>
  - NS_2: <OMITTED>
```

B

```
domain_model:
  group_name: Cloud_1
  interface_group_name: Cloud_1
  interface_component:
    type: Cloud_1
    url: http://cloud1.example.com/
  component_types:
    Cloud_1: <OMITTED>
    Cloud_1_VM:
      <OMITTED>
      constraints:
        - $self.cpu <= 5
    Cloud_1_VN: <OMITTED>
    Cloud_1_LGW: <OMITTED>
  relation_types:
    Cloud_1_JoinIn(VM, VN): <OMITTED>
    Cloud_1_Conn(VN, GW): <OMITTED>
  constraints: <OMITTED>
```

Figure 27:
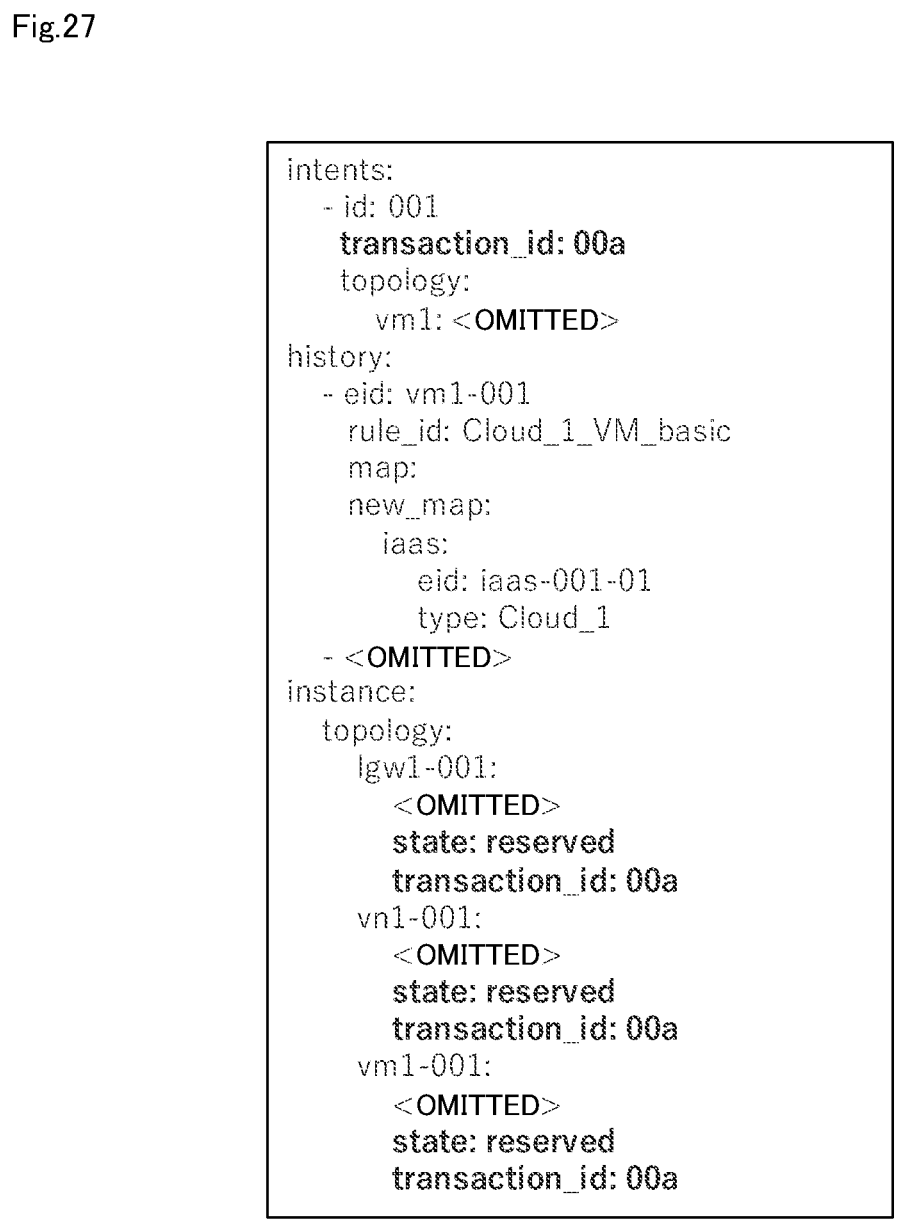

```
intents:
   - id: 001
     transaction_id: 00a
     topology:
        vm1: <OMITTED>
history:
   - eid: vm1-001
     rule_id: Cloud_1_VM_basic
     map:
     new_map:
        iaas:
           eid: iaas-001-01
           type: Cloud_1
   - <OMITTED>
instance:
   topology:
      lgw1-001:
         <OMITTED>
         state: reserved
         transaction_id: 00a
      vn1-001:
         <OMITTED>
         state: reserved
         transaction_id: 00a
      vm1-001:
         <OMITTED>
         state: reserved
         transaction_id: 00a
```

Fig.28

```
intent:
    id: 001
    transaction: true
    transaction_id: 00a
    topology: <OMITTED>
```

```
intent:
    transaction_id: 00a
    transaction: commit
```

```
intent:
    transaction_id: 00a
    transaction: rollback
```

A                          B                          C

INFORMATION PROCESSING APPARATUS, INFORMATION PROCESSING SYSTEM, INFORMATION PROCESSING METHOD, AND COMPUTER-READABLE RECORDING MEDIUM

CROSS-REFERENCE TO RELATED APPLICATION

This application is based upon and claims the benefit of priority from Japanese patent applications No. 2023-022100, filed on Feb. 16, 2023, the disclosure of which is incorporated herein in its entirety by reference.

BACKGROUND OF THE INVENTION

1. Field of the Invention

The present disclosure relates to an information processing apparatus, an information processing system, an information processing method, and a computer-readable recording medium.

2. Background Art

An information communication technology (ICT) system (hereinafter, simply referred to as a "system") needs to be proactively utilized for the development of industries. However, the system configuration is complex, in general, and the fact that quick provision and modification are difficult hinders utilization of the system.

In order address these problems, in Patent Document 1 (International Publication No. WO/2019/216082) and in Non-Patent Document 1 (Takayuki KURODA, Takuya KUWAHARA, Takashi MARUYAMA, Yutaka YAKUWA, Kazuki TANABE, Tatsuya FUKUDA, Kozo SATODA, and Takao OSAKI "Acquisition of Knowledge about ICT System Designing with Machine Learning", IEICE Transactions B Vol. J104-B No. 3 pp. 140-151, 2021 Mar. 1), an automated design technique is disclosed in which system configuration information is generated based on requirements. In these documents, a technique is disclosed in which, in a premise in which a certain single administrator can determine all of the system, based on a certain single requirement that has been input, a single system configuration is generated that satisfies the requirement.

However, in an actual system design, one designer cannot always determine the entire system configuration, and there are cases where the designer configures the system utilizing resources of other domains for which the designer does not have detailed authority to decide.

For example, when an attempt is made to construct a video analysis service, it is possible to arrange the analysis function in a cloud, and construct a network for enabling communication between a camera and an analysis function using a network connection service. Here, the designer who attempts to construct the video analysis service does not have authority to confirm the details of the cloud computing infrastructure or the details of the network infrastructure, or to determine its configuration.

That is, it is understood that the three domains, namely the service, cloud, and network, are respectively managed by different administrators, and one system is configured by the cooperation of these domains. Therefore, with the technique as described in the aforementioned documents, that is, the system design technique based on a premise that a certain single administrator can determine all of the system, it is difficult to appropriately design a system that extends across a plurality of domains that are administered by different administrators.

This is because, as in the aforementioned example, when attempting to construct a system configured by three domains, namely the service, cloud, and network, in actuality, a service designer merely has authority to decide regarding the service configuration. Therefore, the designer has to design assuming a certain situation regarding the usable amount of resources and the like, without analyzing the details of the cloud and network.

In actuality, conditions such as usable amounts of resources in other domains dynamically change according to the situations of other users and situations such as an impairment event, and therefore it is desirable that these conditions can be appropriately taken into consideration.

SUMMARY OF THE INVENTION

An example object of the present disclosure is, in designing an information communication system based on requirements in which resources extending across a plurality of independent domains are utilized, to enable system design in which the resource situations of the domains are taken into consideration.

In order to achieve the example object described above, an information processing apparatus according to an example aspect includes:

an acquiring unit that acquires target system requirement information pertaining to system requirements regarding one or more authority ranges out of system requirements pertaining to an information communication system that is to be designed and is configured across a plurality of authority ranges that are ranges in which a plurality of system design agents have authority regarding system design;

a first generating unit that generates, from first system requirement information belonging to a first authority range out of the one or more authority ranges, first system configuration information pertaining to a system configuration belonging to the first authority range, based on the target system requirement information;

a requesting unit that requests another information processing apparatus, which is an information processing apparatus of another system design agent having the authority for a second authority range that is different from the first authority range, to generate second system configuration information pertaining to a system configuration belonging to the second authority range, based on second system requirement information belonging to the second authority range out of the target system requirement information;

a second generating unit that generates target system configuration information pertaining to a system configuration corresponding to the target system requirement information, based on the first system configuration information and the second system configuration information generated in response to the request; and an output control unit that outputs the target system configuration information to an output device.

Also, in order to achieve the example object described above, an information processing system according to an example aspect includes:

the information processing system including a plurality of information processing apparatuses that are configured to communicate with each other, wherein the plurality of information processing apparatuses each include:

an acquiring unit configured to acquire target system requirement information pertaining to system requirements regarding one or more authority ranges out of system requirements pertaining to an information communication system that is to be designed and is configured across a plurality of authority ranges that are ranges in which a plurality of system design agents have authority regarding system design;

a first generating unit configured to generate, from first system requirement information belonging to a first authority range out of the one or more authority ranges, first system configuration information pertaining to a system configuration belonging to the first authority range, based on the target system requirement information;

a requesting unit configured to request another information processing apparatus, which is an information processing apparatus of another system design agent having the authority for a second authority range that is different from the first authority range, to generate second system configuration information pertaining to a system configuration belonging to the second authority range, based on second system requirement information belonging to the second authority range out of the target system requirement information;

a second generating unit configured to generate target system configuration information pertaining to a system configuration corresponding to the target system requirement information, based on the first system configuration information and the second system configuration information generated in response to the request; and an output control unit configured to output the target system configuration information to an output device.

Also, in order to achieve the example object described above, an information processing method according to an example aspect for a computer to carry out:

acquiring target system requirement information pertaining to system requirements regarding one or more authority ranges out of system requirements pertaining to an information communication system that is to be designed and is configured across a plurality of authority ranges that are ranges in which a plurality of system design agents have authority regarding system design;

generating, from first system requirement information belonging to a first authority range out of the one or more authority ranges, first system configuration information pertaining to a system configuration belonging to the first authority range, based on the target system requirement information;

requesting another information processing apparatus, which is an information processing apparatus of another system design agent having the authority for a second authority range that is different from the first authority range, to generate second system configuration information pertaining to a system configuration belonging to the second authority range, based on second system requirement information belonging to the second authority range out of the target system requirement information;

generating target system configuration information pertaining to a system configuration corresponding to the target system requirement information, based on the first system configuration information and the second system configuration information generated in response to the request; and outputting the target system configuration information to an output device.

Furthermore, in order to achieve the example object described above, a computer-readable recording medium according to an example aspect includes a program recorded on the computer-readable recording medium, the program including instructions that cause the computer to carry out:

acquiring target system requirement information pertaining to system requirements regarding one or more authority ranges out of system requirements pertaining to an information communication system that is to be designed and is configured across a plurality of authority ranges that are ranges in which a plurality of system design agents have authority regarding system design;

generating, from first system requirement information belonging to a first authority range out of the one or more authority ranges, first system configuration information pertaining to a system configuration belonging to the first authority range, based on the target system requirement information;

requesting another information processing apparatus, which is an information processing apparatus of another system design agent having the authority for a second authority range that is different from the first authority range, to generate second system configuration information pertaining to a system configuration belonging to the second authority range, based on second system requirement information belonging to the second authority range out of the target system requirement information;

generating target system configuration information pertaining to a system configuration corresponding to the target system requirement information, based on the first system configuration information and the second system configuration information generated in response to the request; and outputting the target system configuration information to an output device.

As described above, according to the present disclosure, in designing an information communication system based on requirements in which resources extending across a plurality of independent domains are utilized, system design can be performed in which the resource situations of the domains are taken into consideration.

BRIEF DESCRIPTION OF THE DRAWINGS

FIG. 4 is a diagram illustrating an exemplary representation of the constituent element type information, in a graph format, in the first example embodiment.

FIG. 5 is a diagram illustrating an exemplary description of constituent element types, in a text format, in the first example embodiment.

FIG. 6 is a diagram illustrating an exemplary description, in a text format, of domain-specific constituent element types in the first example embodiment.

FIG. 8 is a diagram illustrating an example of the domain definition information in the first example embodiment.

FIG. 11 is a diagram illustrating an example of the system requirement for a lower-level domain that is extracted by the requirement extracting unit, in the first example embodiment.

FIG. 12 is a diagram illustrating an example of the system requirement regarding a lower-level domain, in the first example embodiment.

FIG. 13 is a diagram illustrating an example of another definition of a constituent element type related to a lower-level domain in the first example embodiment.

FIG. 17 is a diagram illustrating an example of the design result to be transmitted, as a response, from a lower-level domain to an upper-level domain in the first example embodiment.

FIG. 23 is a diagram illustrating an example of current system configuration information 209 recorded in the storage unit, in the second example embodiment.

FIG. 24 is a diagram illustrating an example of input and output information of the shared storage unit in the second example embodiment.

FIG. 27 is a diagram illustrating an example of current system configuration information 209 recorded in the storage unit in the third example embodiment.

FIG. 28 is a diagram illustrating an example of the message regarding a design request by a cooperation unit in the third example embodiment.

EXEMPLARY EMBODIMENT

Figure 1:
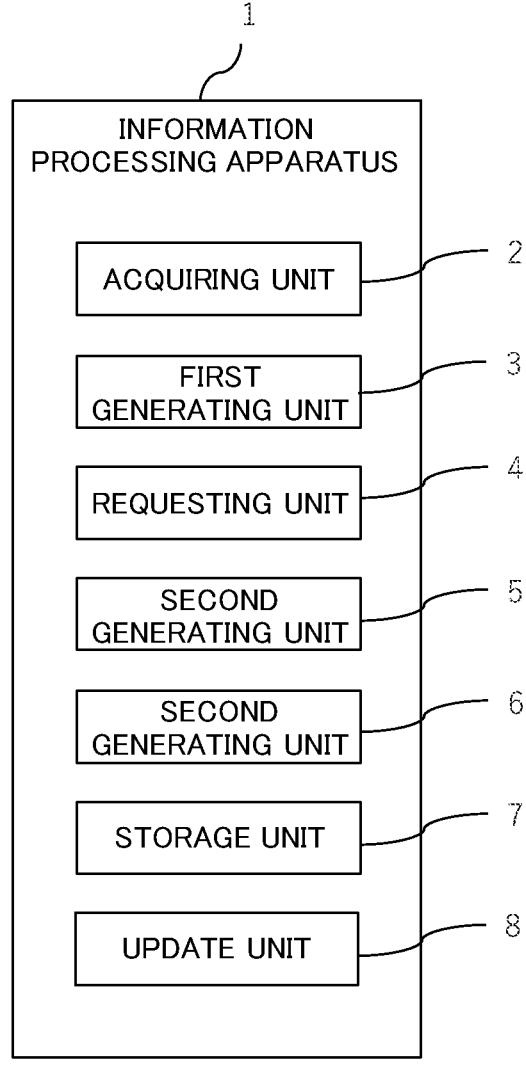
FIG. 1 is a diagram for describing an example of an information processing apparatus of the example embodiment.

Hereinafter, an example embodiment will be described with reference to the drawings. Note that, in the drawings described below, the elements that have the same or corresponding functions are given the same reference numerals and description thereof may not be repeated.

Example Embodiment

The configuration of an information processing apparatus in the example embodiment will be described using FIG. 1. FIG. 1 is a diagram for describing an example of an information processing apparatus 1 of the example embodiment.

[Apparatus Configuration]

The information processing apparatus 1 shown in FIG. 1 includes an acquiring unit 2, a first generating unit 3, a requesting unit 4, a second generating unit 5, and an output control unit 6. Examples of the information processing apparatus 1 include later-described automatic design apparatuses 100, 100*a*, and 100*b*.

The acquiring unit 2 acquires target system requirement information pertaining to system requirements regarding one or more authority ranges, out of the system requirements regarding the information communication system that is to be designed. The information communication system that is to be designed is configured extending across a plurality of authority ranges that are ranges in which a plurality of system design agents respectively have authority regarding system design. Here, the information communication system that is to be designed is assumed to be system-designed by a plurality of design agents (e.g., a designer, an administrator, etc.).

Each design agent has a range in which the design agent has authority to design or determine the system configuration, that is, an "authority range". The authority ranges are independent of each other, and are each referred to as a "domain" in the later-described example embodiments. The authority ranges (domain) may also be hierarchically and independently configured, for example. The authority ranges (domains) being hierarchically and independently configured means that the authority ranges are in a hierarchical relationship in which a first authority range is in an upper level and a second authority range is in a lower level, the first authority range and the second authority range are independent of each other, and one authority range does not interfere with the other authority range, for example.

When the acquiring unit 2 is an acquiring unit 2 of an information processing apparatus in a domain in an uppermost level, the target system requirement information pertaining to system requirements regarding one or more authority ranges may also be system requirement information pertaining to the entirety of the information communication system that is to be designed. Also, when the acquiring unit 2 is an acquiring unit 2 of an information processing apparatus in a domain in a relatively lower level, the target system requirement information pertaining to system requirements regarding one or more authority ranges may also be some system requirement information out of the system requirements pertaining to an information communication system to be designed for which design has been requested by an information processing apparatus in a domain in a relatively upper level. Also, an example of the acquiring unit 2 is a later-described input/output unit 101.

The first generating unit 3 generates first system configuration information pertaining to a system configuration belonging to a first authority range, from first system requirement information belonging to the first authority range out of the one or more authority ranges based on the target system requirement information. An example of the first authority range is a later-described "own domain". An example of the first system requirement information is system requirement information to be used for designing in the own domain, as described later. An example of the first generating unit 3 is a later-described design unit 103.

The requesting unit 4 requests another information processing apparatus to generate second system configuration information pertaining to a system configuration belonging to a second authority range, based on second system requirement information. The second system requirement information is system requirement information belonging to the second authority range that is different from the first authority range, out of the target system requirement information. The other information processing apparatus indicates an information processing apparatus of another system design agent that has authority for the second authority range. Examples of the second authority range and the other information processing apparatus respectively include later-described "other domains" and "automatic design apparatuses 100, 100*a*, and 100*b* in the other domains". An example of the second system requirement information includes system requirement information to be used for designing in another domain, as described later. Examples of the requesting unit 4 include later-described requirement extracting unit 104 and cooperation unit 105.

The second generating unit 5 generates target system configuration information pertaining to a system configuration corresponding to the target system requirement information, based on the first system configuration information and the second system configuration information generated in response to the request. An example of the second generating unit 5 is a control unit 102 that performs later-described merging processing.

The output control unit 6 outputs the target system configuration information to an output device. An example of the output control unit 6 is a later-described input/output unit 101. Examples of the output device include a storage device (including an internal storage device and an external storage device), a display device, a printer, a communication interface, another computer, and a data writer for enabling writing to a storage medium.

As a result of such a configuration, in designing an information communication system based on requirements while utilizing resources extending across a plurality of independent domains, system design can be performed in which the resource situations of the domains are taken into consideration.

That is, when designing an ICT system utilizing resources extending across a plurality of authority ranges (domains), the information processing apparatuses 1 that respectively administer authority ranges that are hierarchically configured can design the entire ICT system in cooperation with each other.

Specifically, the information processing apparatus 1 can configure an information processing system in which a plurality of information processing apparatuses 1 are communicably connected to each other, as described later. In this case, an information processing apparatus 1 that is in a later-described upper-level domain can make a design request to another information processing apparatus 1 in a lower-level domain. As described above, the information processing apparatuses 1 that respectively administer authority ranges that are hierarchically configured can perform, in cooperation with each other, recursive processing, and as a result, the entire ICT system can be designed.

When the requesting unit 4 has received information indicating that the result of generating second system configuration information indicates a failure from another information processing apparatus, the first generating unit 3 may perform the following processing. That is, the first generating unit 3 may generate first system configuration information based on a constraint condition of the other information processing apparatus included in content of the information indicating the failure.

As a result of such a configuration, even if the design result indicates a failure, a system requirement is generated in which a causal factor of the failure is resolved, and as a result, failure in design after the repeated design request can be avoided.

The information processing apparatus 1 further includes a storage unit 7 and an update unit 8. The storage unit 7 stores authority range definition information in which requirements pertaining to system configurations belonging to a plurality of authority ranges are defined. An example of the authority range definition information is later-described domain definition information 108. An example of the storage unit 7 is a later-described storage unit 106.

When the first authority range definition information pertaining to the first authority range out of the authority range definition information stored in the storage unit 7 is updated, the update unit 8 performs the following processing. That is, the update unit 8 updates information corresponding to the first authority range definition information out of the authority range definition information stored in an external storage device, with the updated first authority range definition information. An example of the update unit 8 is a later-described operation management unit 207. An example of the first authority range definition information pertaining to the first authority range is the domain definition information 108 for the own domain, as described later. An example of the external storage device is a later-described shared storage unit 208. Upon receiving a notification indicating that authority range definition information pertaining to an authority range other than the first authority range out of the authority range definition information has been updated from the external storage device, the update unit 8 performs the following processing. That is, the update unit 8 acquires the updated authority range definition information from the external shared storage device, and updates the authority range definition information stored in the storage unit 7 with the updated authority range definition information.

As a result of such a configuration, the constraint conditions pertaining to the system requirements that other domains can accept can be shared in advance. Accordingly, generation of a requirement and transmission of a design request for which it is already understood that the design will fail can be prevented in advance, and the efficiency of the entire processing can be improved.

When requesting another information processing apparatus to generate the second system configuration information, the requesting unit 4 may perform transaction management pertaining to the second system configuration information.

As a result of such a configuration, the system design across a plurality of domains can be performed highly efficiently without contradiction.

The requesting unit 4 may request the other information processing apparatuses to generate the second system configuration information based on the types of the constituent elements of the system requirements that are respectively to be used in the plurality of authority ranges.

As a result of such a configuration, a constituent element type for each domain is prepared, and as a result, design can be executed based on the appropriate constituent element type for each domain.

First Example Embodiment

The information processing apparatus in a first example embodiment is an apparatus that automatically designs a system having a configuration that satisfies system requirements. When the information processing apparatus designs a system utilizing resources extending across a plurality of domains, design agents that respectively administer the domains that are hierarchically configured design the entire system in cooperation with each other, in order to perform appropriate design in which the resource situations of the domains are taken into consideration.

[System Configuration]

Figure 2:
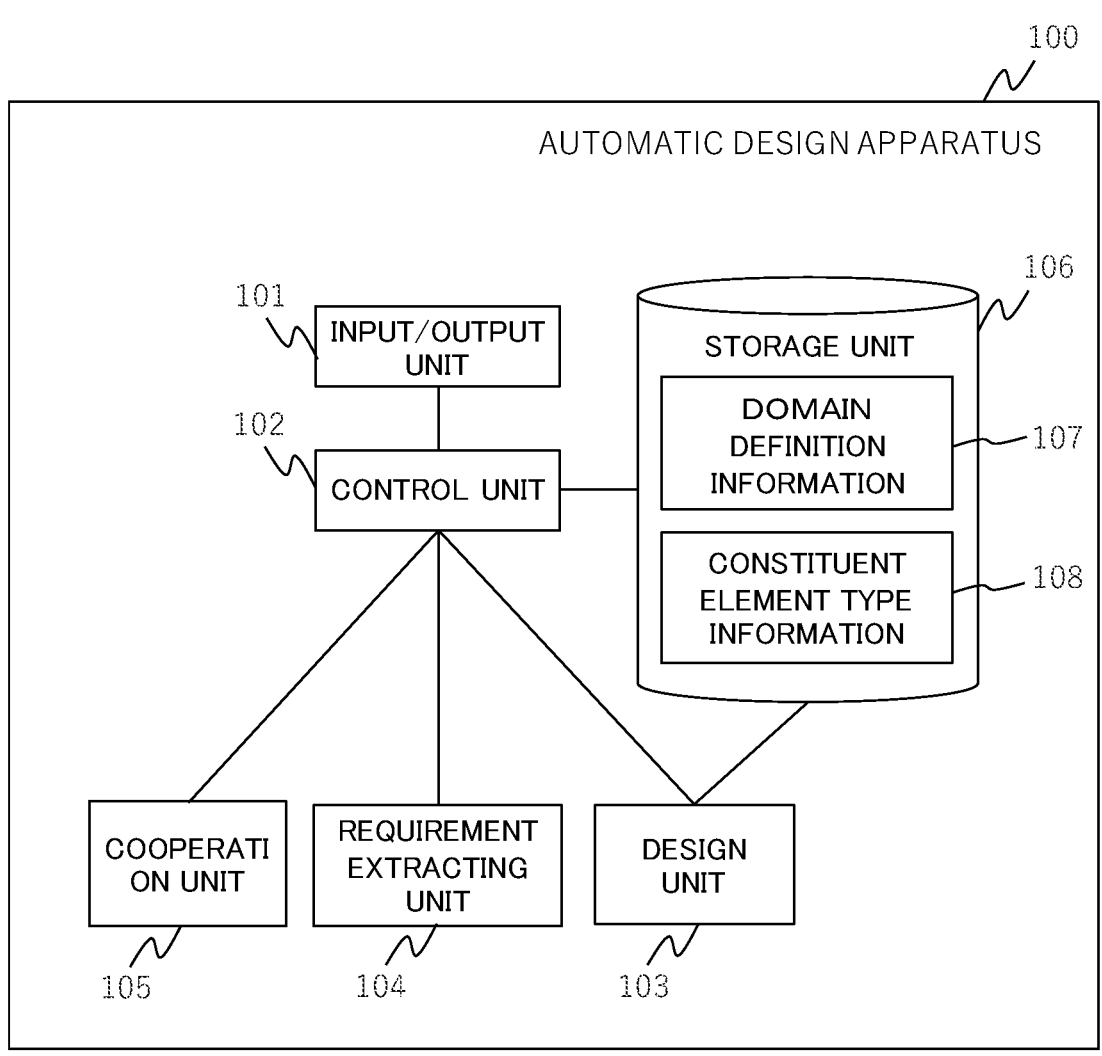
FIG. 2 is a block diagram illustrating a functional configuration of the automatic design apparatus in the first example embodiment.

Next, the configuration of the information processing apparatus 1 of the example embodiments will be more specifically described using FIG. 2. An example of an automatic design apparatus 100 in the first example embodiment of the example embodiments will be described below.

FIG. 2 is a block diagram illustrating a functional configuration of the automatic design apparatus in the first example embodiment. In the first example embodiment, the fact that a plurality of automatic design apparatuses 100 that administer a plurality of domains perform automated design of a system in cooperation with each other based on predetermined domain models of the respective domains will be described.

As shown in FIG. 2, the automatic design apparatus 100 in the first example embodiment includes an input/output unit 101, a control unit 102, a design unit 103, a requirement extracting unit 104, a cooperation unit 105, and a storage unit 106.

The input/output unit 101 accepts an input system requirement information (or may also be simply referred to as "system requirements" or "requirements") representing requirements pertaining to a configuration, a function, a performance, and the like that are required for an ICT system to be designed, from a user or a design apparatus in an upper level. The input/output unit 101 transmits the accepted system requirements to the control unit 102, and requests the control unit 102 to design a system having a configuration that satisfies the system requirements. Also, the input/output unit 101 receives information (design result information) regarding the result of the requested design from the control unit 102, and transmits the design result information as a response to an output device such as a terminal device of the user or the design apparatus in an upper level. Here, examples of the output device include a storage device (including an internal storage device and an external storage device), a display device, a printer, a communication interface, another computer, and a data writer for enabling writing to a storage medium.

The control unit 102 receives system requirements from the input/output unit 101. The control unit 102 designs a system configuration using functions of the design unit 103, requirement extracting unit 104, and cooperation unit 105. The control unit 102 transmits information regarding the designed system configuration to the input/output unit 101.

The control unit 102 transmits the system requirements received from the input/output unit 101 to the design unit 103, and requests the design unit 103 to design a system having a configuration that satisfies the system requirements in an own domain. The control unit 102 receives a design result in the own domain from the design unit 103. The control unit 102 transmits the received design result in the own domain to the requirement extracting unit 104, and receives, as a response from the requirement extracting unit 104, a set of requirements to be requested of the domains.

The control unit 102 transmits the requirements to be requested of the domains to the cooperation unit 105, and requests the cooperation unit 105 to design, by the other domains, a system having a configuration that satisfies the system requirements. The control unit 102 receives a set of the results of design performed by the other domains from the cooperation unit 105.

If the results of design performed by the other domains that are received from the cooperation unit 105 are all successful, the control unit 102 merges the results of design performed by the other domains with the result of design in the own domain. The control unit 102 transmits the merged design result to the input/output unit 101 as the system configuration. If the results of design performed by the other domains that are received from the cooperation unit 105 include a failure, the control unit 102 notifies the design unit 103 of that fact, and again executes the series of design operations.

The design unit 103 acquires constituent element type information 107 needed for design processing from the storage unit 106. The design unit 103 receives system requirements from the control unit 102, concretizes the received system requirements based on the constituent element type information 107, and transmits the result of design of the system configuration in the own domain to the control unit 102.

The requirement extracting unit 104 receives the result of design of the system configuration in the own domain from the control unit 102. The requirement extracting unit 104 extracts requirements to be requested of other domains from the result of design of the system configuration in the own domain, and transmits, as a response, the extracted requirements to be requested of the other domains to the control unit 102. It is possible that a plurality of other domains are present in one system configuration, and therefore the requirements to be transmitted are a set of requirements.

The cooperation unit 105 receives the requirements to be requested of other domains from the control unit 102, and transmits the received requirements to be requested of other domains to input/output units 101 of the respective other domains. The cooperation unit 105 receives design results from the input/output units 101 of the respective other domains as the request results, and transmits, as a response, the received design results to the control unit 102.

The storage unit 106 readably stores the constituent element type information 107 and the domain definition information 108. The constituent element type information 107 is information in which the properties of constituent elements that configure the system are described for the respective types, and is information needed for design processing performed by the design unit 103. The domain definition information 108 is information related to other domains, and includes information for specifying an automatic design apparatus that administers design pertaining to a certain domain. Note that the domain definition information 108 may also include information pertaining to the own domain, in addition to information related to the other domains.

Figure 3:
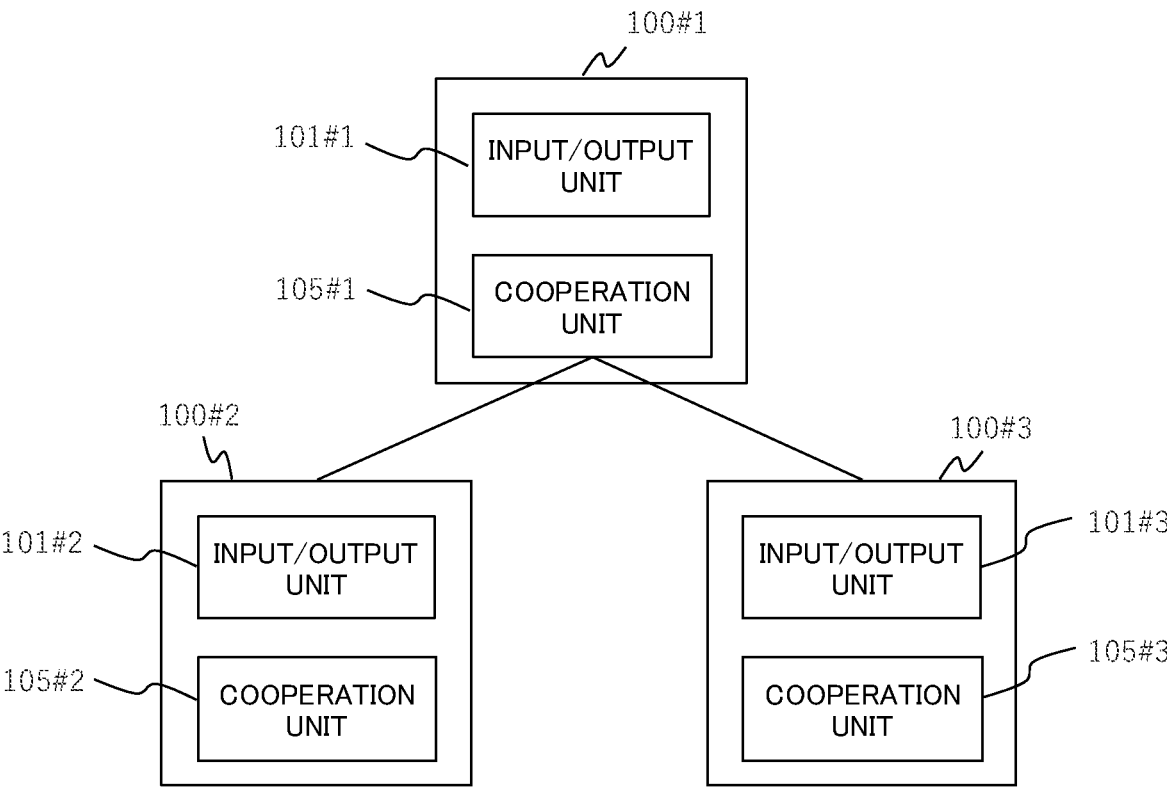
FIG. 3 is a block diagram illustrating the overall configuration of a hierarchized automatic design apparatus group in the first example embodiment.

FIG. 3 is a block diagram illustrating the overall configuration of a hierarchized automatic design apparatus group in the first example embodiment. As shown in FIG. 3, the automatic design apparatus 100 in the first example embodiment is divided into a plurality of domains (100#1, 100#2, and 100#3). A cooperation unit 105 (105#1, 105#2, or 105#3) belonging to a certain domain is connected to input/output units 101 (101#1, 101#2, or 101#3) belonging to the other domains such that communication is possible with each other. FIG. 3 shows an example in which the cooperation unit 105#1 of the automatic design apparatus 100#1 belonging to one domain is connected to the input/output units 101#2 and 101#3 of the automatic design apparatuses 100#2 and #3 belonging to the other domains such that communication is possible with each other, and the apparatuses are hierarchized.

Next, the constituent element type information 107 to be used by the design unit 103 in the first example embodiment will be described using FIGS. 4 to 7. The constituent elements in the first example embodiment refer to constituent components that configure a system and the relationships between the constituent components. The constituent element type information 107 is information in which properties of constituent elements are described for respective types of the constituent elements.

FIG. 4 is a diagram illustrating an exemplary representation of the constituent element type information 107, in a graph format, in the first example embodiment. (A), (B), (C), and (D) in FIG. 4 respectively show examples in which pieces of definition information of an Application type, a VM type, a Cloud_1type, and a Conn (Camera, Application) type, which are constituent element types, are respectively represented in a graph format.

In FIG. 4, constituent elements 111, 112, 114, 115, 117, 118, and 120 to 122, which are circle figures, represent constituent components. Arrows 113, 116, and 124 to 127 whose tips are black represent relationships between the constituent components.

The patterns in the constituent components show the types of the constituent components. The labels attached to the constituent elements represent type names and identifiers of the constituent elements, and a type name is described on the left side of ":" (colon), and an identifier is described on the right side thereof. The type names and identifiers may also be omitted in the description.

Constituent elements 111, 114, and 118 denoted by double lines represent the constituent element types to be defined themselves. Constituent elements 112, 115, and 117 denoted by single lines represent peripheral configurations (hereinafter, denoted as "dependent configurations") on which the constituent element types to be defined depend. An arrow 119 whose tip is white represents a succession relationship of constituent element types.

For example, FIG. 4(A) represents the definition information of the Application type, and represents that the Application type depends on a situation of connection to the VM type with an HostedOn type relationship. Stated more plainly, this definition means that this Application software needs to be hosted by a VM (virtual machine) in order to operate.

Also, FIG. 4(B) represents definition information of the VM type, and shows that the VM needs to be hosted by IaaS (Infrastructure as a Service), for example. IaaS (Infrastructure as a Service) is a service for providing a virtual computation resource (virtual machine: VM) and a virtual network (VN), in general.

FIG. 4(C) represents the definition information of the Cloud_1 type, and shows that the Cloud_1 type succeeds to the IaaS type. Cloud_1 is a provider of an imaginary IaaS illustrated in the first example embodiment. It is indicated that when one type A succeeds to another type B, the one type A is one type of the other type B, and the one type A takes over the properties of the other type B. That is, it is declared that Cloud_1 is one type of IaaS, and has ordinary properties as IaaS.

FIG. 4(D) shows definition information of the Conn (Camera, Application) type. Conn (Camera, Application) is a relationship type, that is, a type representing the relationship between constituent components. The relationship type is described by combining a base type and a both end type. The base type is a type of the relationship. The both end type refers to types of constituent components at both ends of the relationship. A portion before a parenthesis indicates the base type, and two types separated by a comma in the parenthesis indicate the both end type. The first type in the parenthesis is a connection source type, and the second type is a connection destination type.

In FIG. 4(D), Conn indicates a base type indicating a relationship of being communicably connected. That is, the Conn(Camera, Application) type is a relationship type representing a communication connection type from Camera to Application. Note that in the representation in a graph format, when denoting a label of the relationship type, description of the both end type may be omitted as appropriate.

As shown in FIG. 4(D), Conn(Camera, Application) has a dependent configuration. That is, the dependent configuration in FIG. 4(D) represents that the types (120, 123) at both ends depend on the situation of being respectively connected to different GW (Gateway) type constituent components 121 and 122 with Conn type relationships 125 and 127. Also, it is represented that the connection between the two GW type constituent components 121 and 122 depend on a situation of being connected by a Conn type relationship 126. When this dependency is stated plainly, it is shown that in order to communicably connect a certain Camera and Application, these components need to be communicably connected via GW.

FIG. 5 is a diagram illustrating an exemplary description of constituent element types, in a text format, in the first example embodiment. (A), (B), and (D) in FIG. 5 respectively show exemplary descriptions regarding the types described in (A), (B), and (D) in FIG. 4. Only (C) in FIG. 5 shows an exemplary description of an IaaS type to which a Cloud_1 type succeeds, instead of the Cloud_1 type described in FIG. 4(C). An exemplary description of the Cloud_1 type will be described later. In this specification, the description format in text basically conforms to the YAML format. The YAML format is widely used as a description format of an ordinary data structure constituted by a combination of data structures called an array or a dictionary.

In (A) to (D) in FIG. 5, first lines represent type names. Second lines and below are indented. In YAML, the description content in an indented portion is an attribute of an element declared immediately above. That is, it is shown that the constituent element type includes three attributes, namely "concrete", "properties", and "expect". Among these, it is shown that "expect" includes an attribute "basic". It is shown that "basic" includes an attribute "topology".

In this exemplary description, "concrete" indicates whether or not the type is a concrete type. As shown in (A) in FIG. 5, "Application" is a concrete type because the value of "concrete" is "true". As shown in FIG. 5 (B), "VM" is an abstract type because the value of "concrete" is "false".

"properties" represents the type of attribute value that can be held by the type. As shown in (A) in FIG. 5, "Application" includes an attribute "performance". As shown in (B) in FIG. 5, "VM" includes an attribute "cpu".

"expect" represents the dependent configuration illustrated also in FIG. 4. One constituent element type can have a plurality of variations of the dependent configuration, and in each variation, after the name is declared, content is described in an indented portion. "basic" is a name of one of the dependent configurations. Each dependent configuration has two attributes, namely "topology" and "constraints". "topology" represents the dependent configuration itself. "constraints" represents an auxiliary constraint condition.

For example, as shown in (A) in FIG. 5, "topology" of a dependent configuration named "basic" includes two constituent components, namely "$self" and "vm". "$self" indicates that there is a HostedOn(Application, VM) type relationship with a vm. Here, "$self" represents a target itself for which the type is defined, and here, "Application" is indicated. "$" represents that a certain constituent element is referred to. A description "$vm" represents that a constituent element named "vm" is referred to.

"relation" is a relationship, and the relationship type and a reference to the constituent element that is the connection destination are respectively described in "type" and "dest". That is, this definition indicates that "Application" needs to be hosted by "VM", similarly to the illustration in (A) in FIG. 4.

In "constraints", a relational formula "$vm.cpu>=$self.performance/10" is designated. The value of a "cpu" attribute of a constituent element "vm" is indicated in a "$vm.cpu" portion. A "$self.performance" portion indicates a value of a "performance" attribute that the "Application" itself has. That is, the aforementioned relational formula indicates that every time the "Application" performance is increased by 10 units, at least one "cpu" of a VM needs to be added. That is, if an Application performance of 10 is required, at least one piece of cpu of the VM is needed, and if an Application performance of 30 is required, at least three pieces of cpu of the VM are needed.

Note that "$src" and "$dest" described in FIG. 5 (D) respectively represent elements that are the connection source and the connection destination in the relationship type "both end type" to be defined, in the definition of the relationship type.

FIG. 6 is a diagram illustrating an exemplary description, in a text format, of domain-specific constituent element types in the first example embodiment. (A) and (B) in FIG. 6 show constituent component types defined for a specific domain named "Cloud_1".

A "derived_from" attribute that each type shown in (A) and (B) in FIG. 6 has represents the type name of the succession destination of the type. As shown in (A) in FIG. 6, the Cloud_1 type succeeds to the IaaS type. As shown in (B) in FIG. 6, the Cloud_1_VM type succeeds to the VM type. That is Cloud_1 is one type of IaaS, and Cloud_1_VM is one type of VM. Note that a plurality of types may succeed to the same type.

Here, basic functions of the automatic design apparatus 100 in the first example embodiment will be described. The automatic design apparatus 100 in the first example embodiment receives input of the system requirements, concretizes the received system requirements, and outputs the result of concretization as a system configuration.

The system requirements and system configuration are each information represented by a graph constituted by constituent components and relationships, and each constituent element has a type. The system requirements may include an abstract type (type for which the value of the concrete attribute is false) constituent element. On the other hand, the system configuration invariably includes only the concrete type (type for which the value of the concrete attribute is true) constituent elements.

Also, there are cases where a dependent configuration is not included in the periphery of constituent elements included in the system requirements. On the other hand, it is ensured that in the periphery of constituent elements included in the system configuration, any of dependent configurations defined by respective types are included.

That is, the automatic design apparatus 100 in the first example embodiment receives input of a system requirement, which is an abstract configuration including an abstract type constituent element or a constituent element that does not satisfy a dependent configuration. Then, the automatic design apparatus 100 concretizes the abstract configuration by replacing all of the abstract constituent elements with concrete constituent elements that succeed thereto, and complementing dependent configurations in the periphery of the respective constituent elements. Also, the automatic design apparatus 100 outputs the completely concretized configuration as a system configuration.

Figure 7:
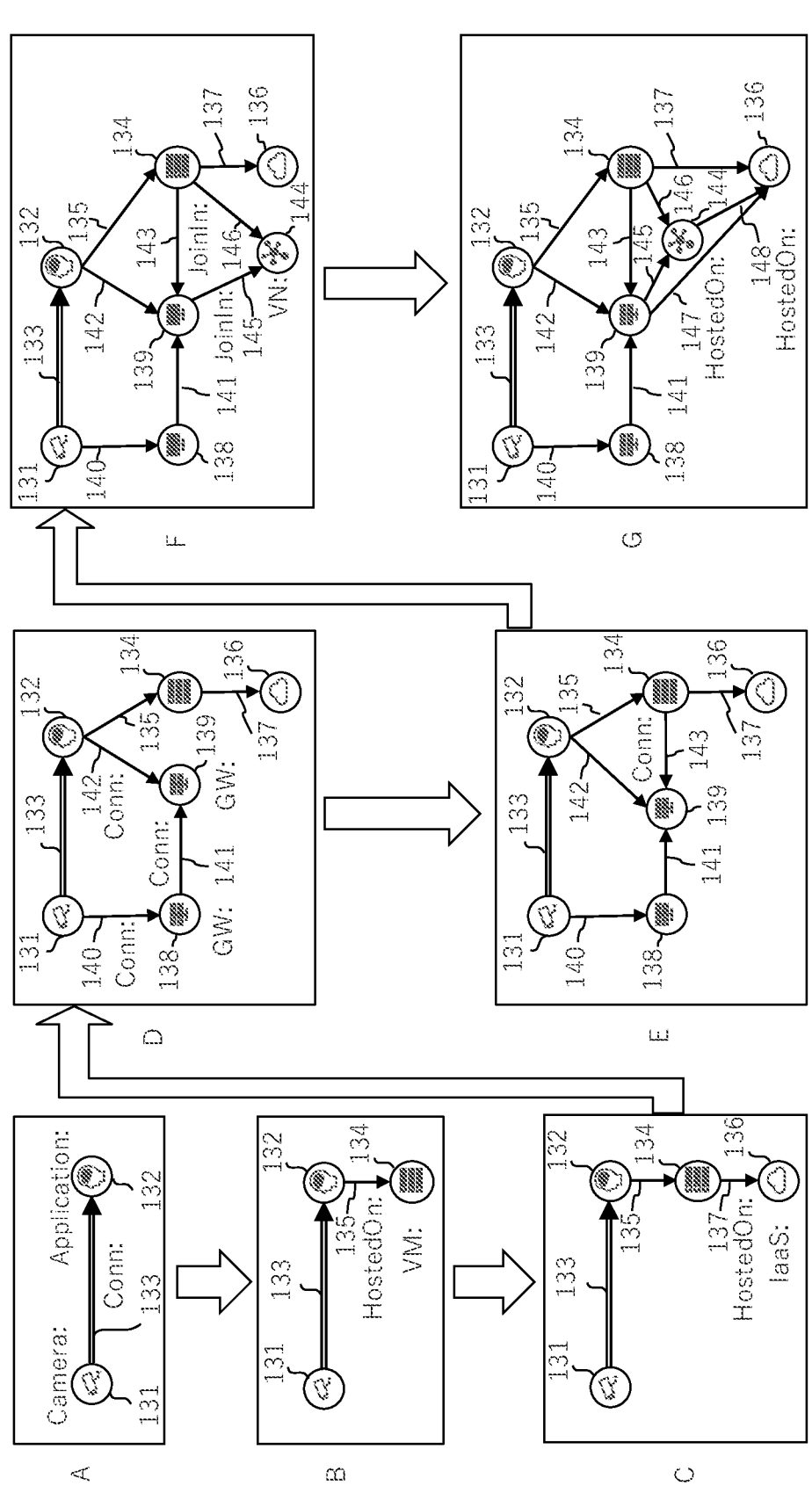
FIG. 7 is a diagram illustrating an exemplary operation of the automated design in the first example embodiment.

FIG. 7 is a diagram illustrating an exemplary operation of the automated design in the first example embodiment. In (A) to (G) in FIG. 7, an example in which dependent configurations are gradually complemented is illustrated.

(A) in FIG. 7 represents an abstract configuration in which a Camera type constituent component 131 and an Application type constituent component 132 are connected with a Conn type relationship 133.

In (B) in FIG. 7, a dependent configuration is complemented in which the Application type constituent component 132 in (A) in FIG. 7 depends on a situation of being connected to a VM type constituent component 134 with a HostedOn type relationship 135.

In (C) in FIG. 7, a dependent configuration is complemented in which the VM type constituent component 134 in (B) in FIG. 7 depends on a situation of being connected to an IaaS type constituent component 136 with a HostedOn type relationship 137.

In (D) in FIG. 7, a dependent configuration is complemented in which the VM type constituent component 134 in (C) in FIG. 7 depends on a situation of being connected to the IaaS type constituent component 136 with the HostedOn type relationship 137.

In (D) in FIG. 7, a dependent configuration is complemented in which the both end type constituent components 131 and 132 at the two ends of the relationship 133 in (C)

in FIG. 7 depends on a situation of being respectively connected to GW type constituent components 138 and 139 with Conn type relationships 140 and 142. Also, a dependent configuration is complemented in which the two GW type constituent components 138 and 139 depend on a situation of being connected with a Conn type relationship 141.

In (E) in FIG. 7, a dependent configuration is complemented in which the VM type constituent component 134 in (D) in FIG. 7 depends on a situation of being connected to the GW type constituent component 139 with a Conn type relationship 143.

In (F) in FIG. 7, a dependent configuration is complemented in which the VM type constituent component 134 and GW type constituent component 139 in (E) in FIG. 7 depend on a situation of being connected to a VN (Virtual Network) type constituent component 144 with JoinIn type relationships 145 and 146, respectively. The JoinIn type indicates presence in a certain place.

In (G) in FIG. 7, a dependent configuration is complemented in which the GW type constituent component 139 and VN type constituent component 144 in (F) in FIG. 7 depend on a situation of being connected to the IaaS type constituent component 136 with HostedOn type relationships 147 and 148, respectively.

In addition to the complementation of dependent configurations shown in FIG. 7, an operation to replace abstract types with concrete types that respectively succeed thereto is performed, and as a result the system configuration can be derived.

Note that, more accurately stated, each type can retain a plurality of types of dependent configurations. Also, a plurality of types may succeed to a certain abstract type. Therefore, a plurality of options arise in each step of the concretization.

When a wrong selection is performed, a completely concretized system configuration may not be reached. In even such a case, a completely concretized system configuration may be reached by tracing back the steps, and performing another selection. This operation corresponds to searching, and the designing can be understood as search processing in which a route to reach a completely concretized system configuration is searched, with the system requirement being an origin, by tracing concretization operations that branch to a plurality of options.

FIG. 7 shows one example of a search route out of search routes that originally branch to a plurality of routes. A configuration that appears in the middle of concretization is referred to as a "configuration draft", and the system requirement, the configuration draft, and the system configuration are collectively referred to as "configuration idea information". With respect to each piece of configuration idea information, the constraint condition retained by each constituent element included therein is checked, and the concretization is also regarded as a failure when the constraint condition is not satisfied.

Next, domain definition information 108 that is needed to divide the function of automated design into a plurality of domains and cause the divided functions to cooperate will be described. In the first example embodiment, the domain definition information 108 is definition information in which information regarding a certain domain is collected.

FIG. 8 is a diagram illustrating an example of the domain definition information 108 in the first example embodiment. (A) in FIG. 8 shows a description example in text of the domain definition information 108. (B) in FIG. 8 shows a representation example, in a graph format, of a constituent component that is to be an interface in the domain definition information 108.

The domain definition information 108 is information representing an automatic design apparatus 100 that administers design regarding a certain domain. In the domain definition information 108, an interface corresponding to an element to which design regarding the domain is requested, and the situation of the system requirement that the interface can accept is defined.

As shown in (A) in FIG. 8, the domain definition information 108 includes five pieces of information, namely "domain_name", "interface_component", "component_types", "relation_types", and "constraints". "domain_name" represents the name of the domain. "interface_component" represents an element to which design is requested. "component_types" and "relation_types" represent types that can be included in a system requirement regarding which design is requested. "constraints" represents constraint conditions that the system requirement to be transmitted to the domain needs to satisfy.

"interface_component" includes two attributes, namely "type" and "url". "type" represents the constituent element type that is to be used when "interface_component" of the domain is represented as a constituent component, in a system configuration that is a design result in another domain that requests the domain to perform design. Also, "url" represents a message notification destination that is used by a cooperation unit 105 in the other domain requests the domain to perform design.

Note that it is possible that one domain relates to a plurality of other domains, and therefore the domain definition information 108 records pieces of information of the domains in an array, the entirety thereof being "domain_models".

An example of the system requirement and system configuration will be described according to a certain scenario below. First, an example of the system requirement and system configuration will be described in an application domain. Next, an example of the system requirement to another domain that is extracted from the system configuration, and the system configuration, which is the design result, will be described.

Figure 9:
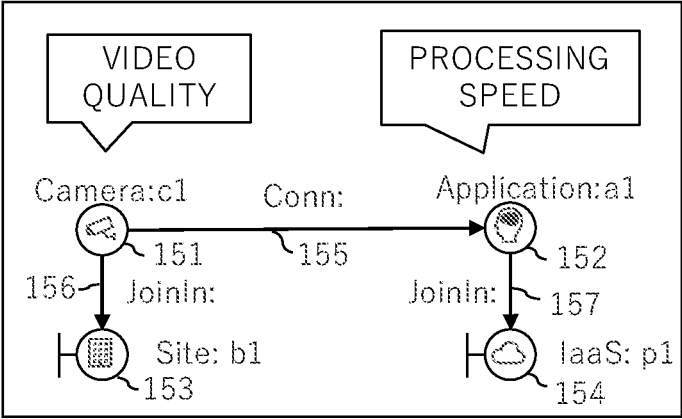
FIG. 9 is a diagram illustrating an example of the system requirement to be input to the input/output unit in the first example embodiment.

FIG. 9 is a diagram illustrating an example of the system requirement to be input to the input/output unit 101 in the first example embodiment. In FIG. 9, an example of the requirement of a certain video analysis application is represented. (A) in FIG. 9 is a representation diagram of a system requirement in a graph format. (B) in FIG. 9 represents an exemplary description of the system requirement, in text, that is the same content as in (A) in FIG. 9. For example, the input/output unit 101 receives, as an input, the system requirement shown in (B) in FIG. 9 that is acquired from a user or a design apparatus in an upper level.

In (A) in FIG. 9, it is shown that a constituent component 151 represented by Camera:c1 and a constituent component 152 represented by Application:a1 need to be communicably connected with a Conn type relationship 155.

JoinIn relationship types 156 and 157 indicate presence in certain places. That is, it is requested that Camera:c1 (151) is present in Site:b1 (153) and Application:a1 (152) is provided by some IaaS:p1 (154).

In addition thereto, it is shown that Camera:c1 (151) is requested to have a certain video quality, and Application:a1 is requested to have a certain processing speed. Specifically, as shown in (B) in FIG. 9, "100" and "30" are respectively given to a "quality" attribute of "c1" and a "performance"

attribute of "a1". These values are given to the aforementioned constraint condition and are taken into consideration. As a result, the automatic design apparatus 100 is requested to derive a system configuration having a resource amount in a certain level or more.

Figure 10:
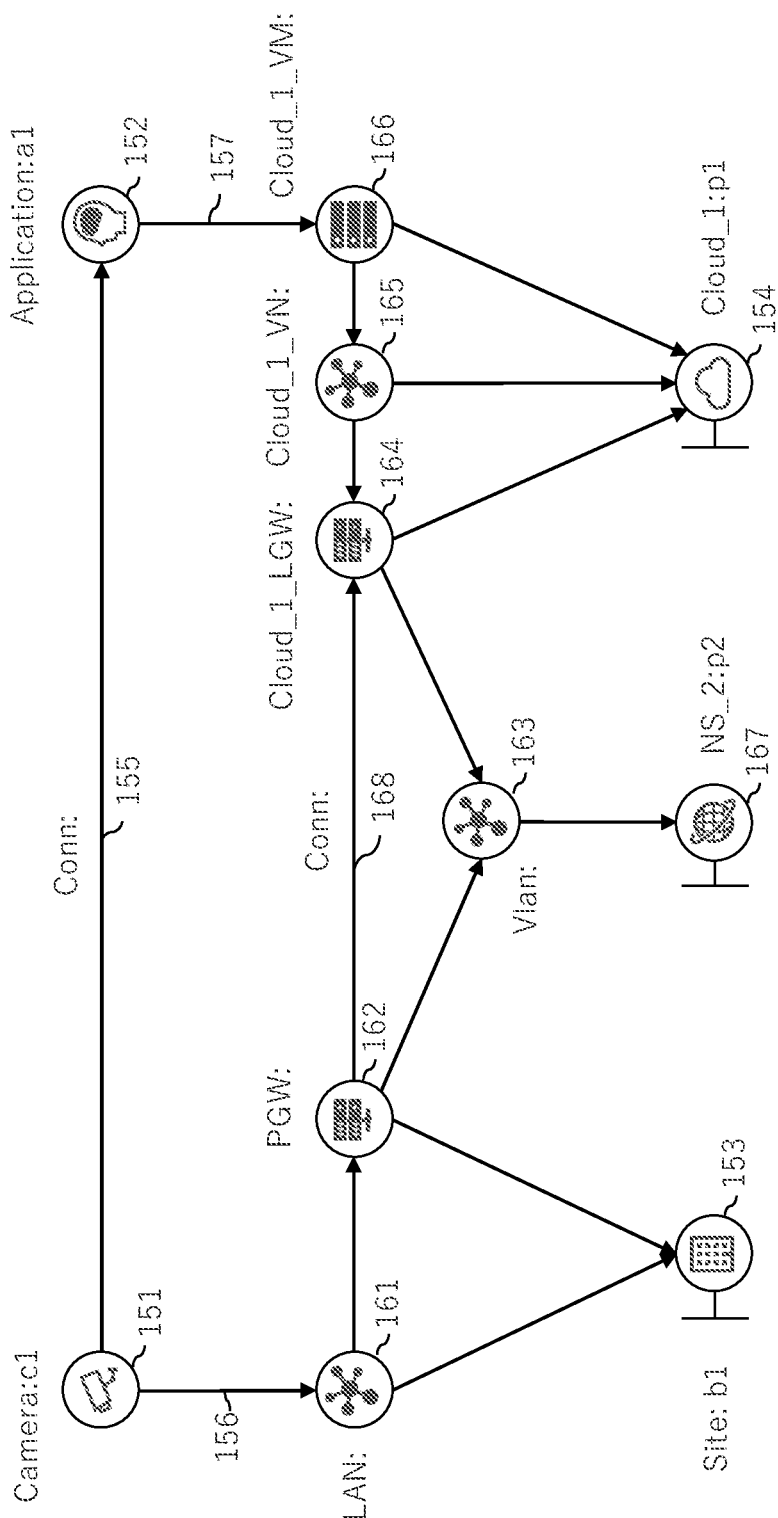
FIG. 10 is a diagram illustrating an example of the system configuration in the first example embodiment.

FIG. 10 is a diagram illustrating an example of the system configuration in the first example embodiment. Specifically, FIG. 10 shows an example of the design result obtained by concretizing the system requirement shown in FIG. 9. In the description, some relationships are omitted in order to avoid complicating FIG. 10.

A VM (166) needed for Application:a1 (152) to operate is given thereto. IaaS (154) needed for the VM (166) to operate is given thereto. Cloud_1 that is one type of IaaS (154) is specifically adopted as IaaS (154). Also, Cloud_1_VM, which is a special VM provided by Cloud_1, is adopted as the VM (166).

Conn (155) connecting Camera:c1 (151) and Application: a1 (152) is a connection via a LAN (Local Area Network) (161), VNs (Virtual Networks) (163 and 165), and GWs (Gate Ways) (162 and 164), which are networks to which Camera:c1 (151) and Application:a1 (152) belong. In particular, the connection between the GWs of Camera:c1 (151) and Application:a1 (152) is realized by a Vlan (Virtual LAN) (163) provided by NS_2 (167). Here, NS_2 (167) is an imaginary virtual network provider illustrated in the first example embodiment.

The design result illustrated in FIG. 10 can be generated by causing the automatic design apparatus 100 to concretize the system requirement using type definition information described in the domain definition information 108 of each domain, in addition to the constituent element type information 107 recorded in the storage unit 106.

Next, an example of the system requirement that is requested of another domain will be described. The system requirement when one automatic design apparatus (upper-level domain) requests another automatic design apparatus (lower-level domain) to perform design will be described below.

FIG. 11 is a diagram illustrating an example of the system requirement for a lower-level domain that is extracted by the requirement extracting unit 104, in the first example embodiment. The system requirement shown in FIG. 11 corresponds to a partial configuration obtained by extracting, from the design result shown in FIG. 10, only the constituent elements 164, 165, and 166 connected to Cloud_1, and the relationships between these constituent elements, an identifier of the requirement being given to the partial configuration. (A) in FIG. 11 shows an exemplary representation of the system requirement for a lower-level domain, in a graph format. (B) in FIG. 11 shows an exemplary description of the system requirement for a lower-level domain in text. In (B) in FIG. 11, an "id" attribute is present, and "001" is given to its value.

Next, an example of the system requirement to be used by another domain as input information at the time of design will be described. The system requirement to be received by another automatic design apparatus (lower-level domain) that is requested to perform design from one automatic design apparatus (upper-level domain) will be described below.

FIG. 12 is a diagram illustrating an example of the system requirement regarding a lower-level domain, in the first example embodiment. The system requirement shown in FIG. 12 includes the system requirement shown in FIG. 11, and includes constraint conditions that the domain needs to consider on its own, in addition thereto. In FIG. 12, the portions different from FIG. 11 are denoted in boldface.

A certain domain may receive system requirements from a plurality of other domains. Therefore, the system requirements are recorded in an array. In this case, in the system requirement, "id" of a received system requirement and "topology", which is the main content of the system requirement, are recorded as elements of the array.

Note that pieces of id of the constituent elements in the topology are freely set by a plurality of different domains, and there is a risk that a duplication may occur, and therefore uniqueness is ensured by giving id of the system requirement.

Also, in the example in FIG. 12, a system requirement set by the Cloud_1 domain itself is included, and "every(PM, $_.cpu<=5)" is described as a constraint condition that is considered on its own. This constraint condition means that the values of cpu (Central Processing Unit) attributes of all of PM (Physical Machine) type constituent elements are 5 or less. The management policy, of the cloud computing infrastructure provider, that a cloud computing infrastructure is configured by only small-scale physical machines is reflected in this example. Such a constraint condition is set by an operator of the cloud computing infrastructure.

FIG. 13 is a diagram illustrating an example of another definition of a constituent element type related to a lower-level domain in the first example embodiment. The constituent element type shown in FIG. 13 is a Cloud_1_VM type, and is the same type as the type already defined in (B) in FIG. 6, but the definition content differs from that of the constituent element type in (B) in FIG. 6. In FIG. 13, the portions different from (B) in FIG. 6 are denoted in boldface.

(B) in FIG. 6 shows a definition of the Cloud_1_VM type that is referred to when an automatic design apparatus 100 in a domain other than the Cloud_1 domain (that is, upper-level domain) performs design. In contrast, FIG. 13 shows a definition of the Cloud_1_VM type that is referred to when the automatic design apparatus 100 in the Cloud_1 domain (that is, lower-level domain) performs design.

More specifically, Cloud_1_VM in (B) in FIG. 6 is a definition for mainly deriving a system requirement for the Cloud_1 domain. In contrast, the definition of Cloud_1_VM in FIG. 13 is a more specific definition in which, in order to be actually operated on a cloud computing infrastructure in the Cloud_1 domain, a dependent configuration for requesting a physical machine that is a hosting destination and the like are shown.

As described above, in a lower-level domain, the Cloud_1_VM type described in FIG. 6 (B) is converted to the Cloud_1_VM type described in FIG. 13, and the converted type is applied. Therefore, as a result of preparing constituent element types for the respective domains, design can be executed based on an appropriate constituent element type that is prepared for each domain.

Figure 14:
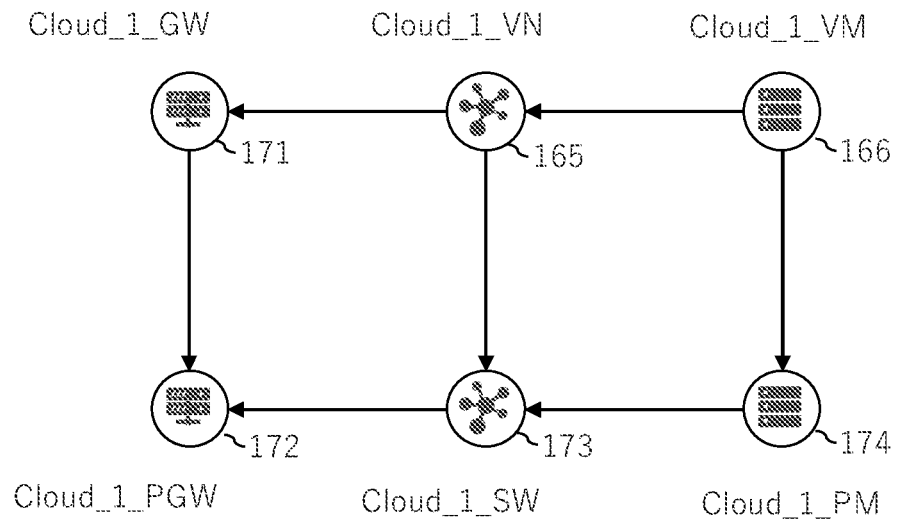
FIG. 14 is a diagram illustrating an example of a system configuration pertaining to a lower-level domain in the first example embodiment.

FIG. 14 is a diagram illustrating an example of a system configuration pertaining to a lower-level domain in the first example embodiment. FIG. 14 is a result of performing design regarding system requirements that include the system requirement shown in FIG. 12, using the definition of the constituent element type in the domain shown in FIG. 13.

A configuration component Cloud_1_VM (166) and a configuration component Cloud_1_GW (171) are connected via a configuration component Cloud_1_VN (165). The configuration component Cloud_1_VM (166) is connected to a configuration component Cloud_1_PM (174). The configuration component Cloud_1_GW (171) is connected to a configuration component Cloud_1_PGW (172). The configuration component Cloud_1_PM (174) and the configuration component Cloud_1_PGW (172) are connected via a configuration component Cloud_1_SW (173). The configuration component Cloud_1_VN (165) is connected to the configuration component Cloud_1_SW (173).

The diagram in FIG. 14 includes constituent elements such as physical machines represented by the configuration component Cloud_1_PGW (172) and configuration component Cloud_1_PM (174), and a physical network switch represented by the configuration component Cloud_1_SW (173). The constituent elements such as a physical machine and a physical network switch are not needed by an operator in another domain that merely uses Cloud_1 as service, but is an important matter of concern for the operator of the Cloud_1 domain.

Figure 15:
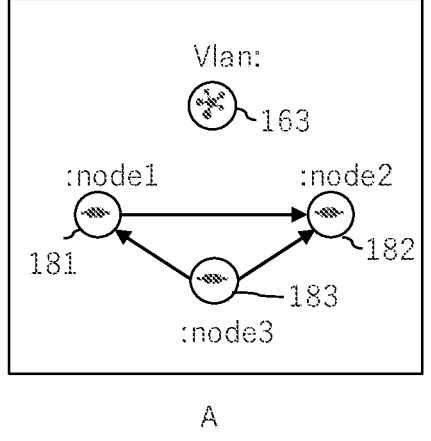
FIG. 15 is a diagram illustrating another example (part 1) of the system requirement regarding a lower-level domain in the first example embodiment.

FIG. 15 is a diagram illustrating another example (part 1) of the system requirement regarding a lower-level domain in the first example embodiment. FIG. 15 shows an example of the system requirement that an automatic design apparatus 100 in an NS_2 domain (167) that provides Vlan (163) in FIG. 10 uses for design. FIG. 15 (A) is a representation diagram of the system requirement in a graph format. FIG. 15 (B) shows an exemplary description of the system requirement in text, the content being the same as that in FIG. 15 (A).

In FIG. 15 (B), a system requirement 184 received from a domain in an upper level is included, and is given id of "002". In addition, a system requirement 185 given id of "ns2" is included. The system requirement 185 given id of "ns2" represents a configuration of the network infrastructure that the NS_2 domain itself retains and uses.

Specifically, node1 (181) is connected to node2 (182) with a Conn type relationship. Node3 (181) is connected to node1 (181) and node2 (182) respectively with a Conn type relationship.

Figure 16:
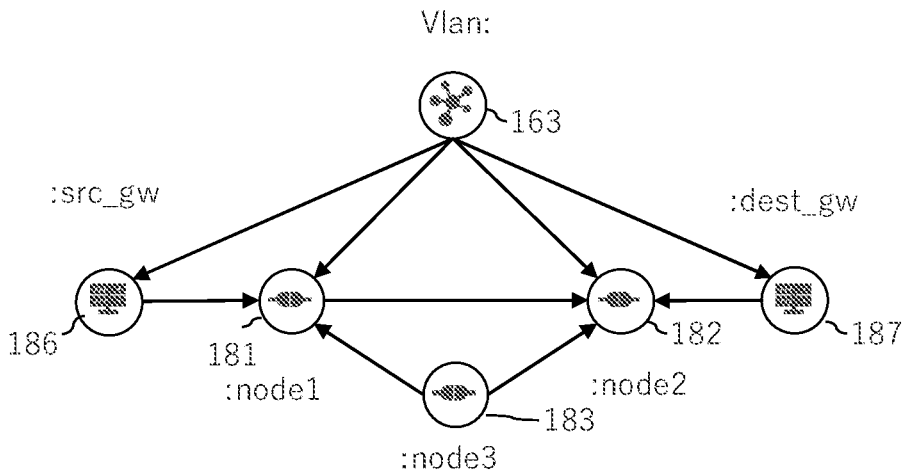
FIG. 16 is a diagram illustrating another example (part 2) of the system configuration regarding a lower-level domain in the first example embodiment.

FIG. 16 is a diagram illustrating another example (part 2) of the system configuration regarding a lower-level domain in the first example embodiment. FIG. 16 is a representation diagram, in a graph format, of an example of the system configuration, which is a design result in the NS_2 domain based on the system requirement shown in FIG. 15.

Paths on the NS_2 network that connect two GWs (186 and 187) at two ends of the Vlan (163) to nearest base stations (181 and 182) and connect the base stations (181 and 182) in a shortest path are given in association with the Vlan (163).

FIG. 17 is a diagram illustrating an example of the design result to be transmitted, as a response, from a lower-level domain to an upper-level domain in the first example embodiment. FIG. 17 shows a design result regarding the system requirement having id of "001" that is transmitted from the aforementioned Cloud_1 domain (lower-level domain).

"intent_id" is id of the received system requirement. "result" shows whether the design result is a success or a failure. For example, when the received system requirement requests a resource of performance higher than that the Cloud_1 domain envisioned, or requests a large amount of resources, an appropriate design result that satisfies the condition cannot be found in the Cloud_1 domain, and the design fails.

In "topology", a partial configuration is described that is obtained by extracting constituent elements mainly included in the system requirement having aforementioned id of 001, out of the design result generated in the Cloud_1 domain. For example, in "topology" (186) in FIG. 17, the content described in "topology" in FIG. 11 (B) is described.

Note that, as a result of the automated design in the Cloud_1 domain, the attribute values of these constituent elements may be concretized, the types may be refined, or another related constituent element may be given.

Also, a modification to the definition of the Cloud_1_VM type is included in FIG. 17, and it is designated that, as a constraint condition (187), the value of the cpu attribute of its own (Cloud_1_VM) is limited to 5 or less. This designation of the constraint condition is for giving notice of the constraint condition to be satisfied by the system requirement, in advance, when changes occur such an operator of the Cloud_1 domain adding a constraint condition while being in operation and the usable resources being exhausted because another domain requests a lot of resources. Accordingly, the constraint condition is taken into consideration in a stage of system requirement, and therefore a design failure after the design has been requested can be avoided in advance.

Also, it is assumed, for example, that the Cloud_1 domain (lower-level domain) that has been requested to perform design from an upper-level domain, when performing design processing based on the system requirement received from the upper-level domain, cannot perform design due to limitation of cpu. In this case, the Cloud_1 domain generates a design result in which a failure (design fails) is written in "result" and a constraint condition that the value of the cpu attribute is limited to 5 or less is added, and transmits the design result to the upper-level domain. Upon receiving the design result from the lower-level domain, the upper-level domain refers to the design result. When the design result is a failure and a constraint condition is added to the design result, the upper-level domain updates the system requirement for the lower-level domain transmitted previously based on the added constraint condition.

That is, the upper-level domain generates a system requirement that can be accepted by the lower-level domain by performing redesign of the system configuration by itself under this constraint condition, and with this, updates the system requirement for the lower-level domain. For example, assume that, first, the upper-level domain designs a system configuration in which a VM in which 10 GB of memory is mounted is used, notifies the lower-level domain of the system requirement including the VM, and receives a constraint condition that up to 5 GB of memory can be mounted in one VM. The upper-level domain redesigns a system configuration including two VMs in each of which 5 GB of memory is mounted based on this constraint condition, and with this, extracts a system requirement that can be accepted by the lower-level domain. Accordingly, even if the design result indicates a failure, as a result of generating a system requirement in which the causal factor of the failure is resolved, a failure in design can be avoided after the repeated design request.

Figure 18:
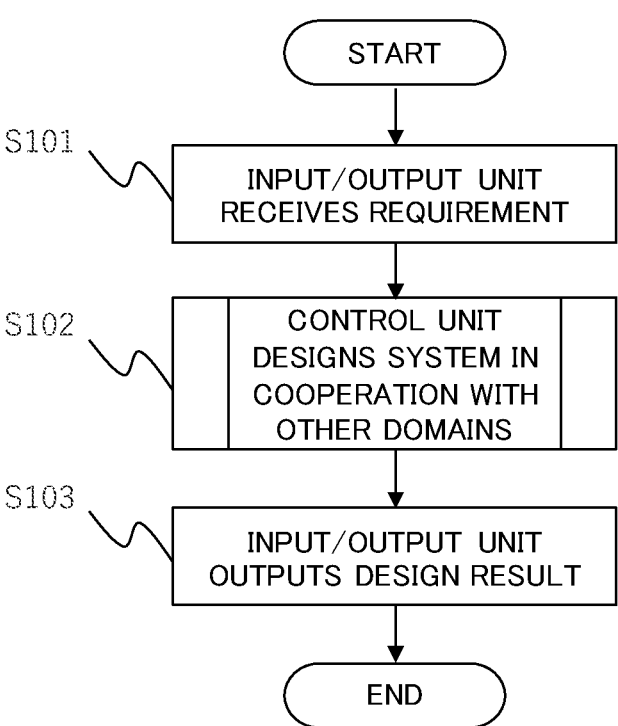
FIG. 18 is a flowchart illustrating the operations of the automatic design apparatus in the first example embodiment.

Next, the operations of the automatic design apparatus 100 in the first example embodiment will be described. FIG. 18 is a flowchart illustrating the operations of the automatic design apparatus in the first example embodiment. First, the input/output unit 101 receives a system requirement from a user or an automatic design apparatus 100 in another domain or the like (step S101).

The control unit 102 performs system design processing for designing a system that has a configuration that satisfies the received system requirement in cooperation with another domain (step S102). The details of the system design processing (step S102) will be described later.

The input/output unit 101 transmits the result of the system design processing and the obtained system configuration to the transmitter of the request (step S103).

Figure 19:
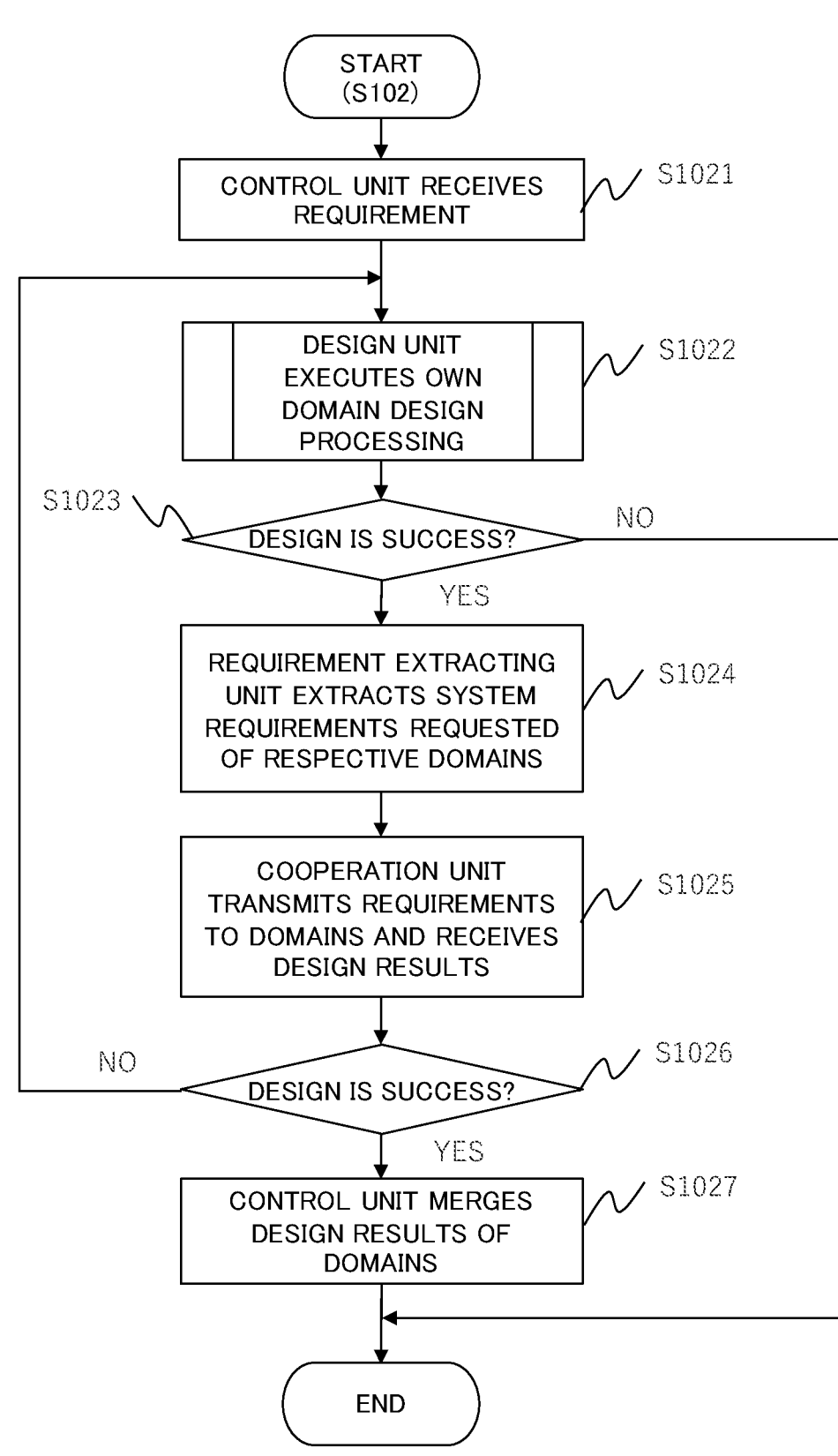
FIG. 19 is a flowchart illustrating an example of the system design processing (step S102 in FIG. 18) in the first example embodiment.

FIG. 19 is a flowchart illustrating an example of the system design processing (step S102 in FIG. 18) in the first example embodiment. First, the control unit 102 receives a system requirement from the input/output unit 101, and transmits the received system requirement to the design unit 103 (step S1021).

Next, the design unit 103 performs design processing (own domain design processing) in the own domain based on the system requirement (step S1022). The details of the own domain design processing (step S1022) will be described later.

Next, the control unit 102 determines whether the design performed by the design unit 103 is a success or a failure (step S1023). The failure in step S1023 does not indicate that one candidate is discarded in a design search, and instead is a complete failure in which it is determined that a configuration idea that satisfies the system requirement cannot be reached. If it is determined as a failure in step S1023 (step S1023: NO), the control unit 102 ends the automated design processing.

If it is determined that the design is a success (step S1023: YES), that is, one configuration idea that satisfies the system requirement has been found, the control unit 102 transmits the design result to the requirement extracting unit 104.

Next, the requirement extracting unit 104 extracts system requirements for the respective domains from the system configuration that is the design result, and transmits, as a response, information (set of extracted system requirements) in which the extracted system requirements are collected to the control unit 102 (step S1024). Here, when extracting system requirements, the requirement extracting unit 104 extracts constituent components having a constituent component type that is declared to be "interface_component" in the domain definition information 108, from the system configuration that is the design result. Then, the requirement extracting unit 104 traces and extracts a partial configuration constituted by constituent components connected to the extracted constituent components and the relationships between the constituent components.

Next, the control unit 102 transmits a set of the extracted system requirements to the cooperation unit 105. The cooperation unit 105 transmits the system requirements to interfaces of the respective domains, based on the domain definition information 108, and requests the domains to perform design. The cooperation unit 105 receives design results corresponding to the requested designs from the domains, and transmits the design results to the control unit 102 (step S1025). If it is determined that the type information has been changed by referring to the design results, the control unit 102 transmits the changed type information to the storage unit 106, and updates the type information in the storage unit 106.

Next, the control unit 102 determines whether or not all of the design results received from the other domains that have been requested indicate a success (step S1026). If it is determined that the design is a success (step S1026: YES), the control unit 102 merges the design results received from the domains with the design result of the own domain. The control unit 102 transmits the merged design result to the input/output unit 101, and also notifies the design unit 103 of the design completion, and ends the processing (step S1027).

In the merging processing, the control unit 102 matches the pieces of id of constituent elements in topologies of the design results received from the other domains with pieces of id of the constituent elements in a topology of the design result in the own domain, and the contents of the latter constituent elements need only be replaced with the contents of the former constituent elements. If there is a constituent element that is added or deleted in the design results of the other domains, the control unit 102 performs addition or deletion in the design result in the own domain as well.

If it is determined that the design is failed (step S1026: NO), the control unit 102 notifies the design unit 103 of the failure, and start performing design again (returns the processing to step S1022). Here, the control unit 102 may transmit a design result, that is, the content of the failure, to the design unit 103. The design unit 103 in the upper-level domain may start design again by changing the constraint condition according to the design result, that is, the content of the failure notified from the lower-level domain, and redesigning the system configuration. For example, when the design result indicates a failure, and the design result includes a constraint condition of the domain to which the request has been sent (request destination domain), the design unit 103 may perform the following processing. That is, the design unit 103 updates the system requirement for the request destination domain by redesigning the system configuration such that the original system requirement and the constraint condition of the request destination domain are satisfied, and transmits this updated system requirement to the request destination domain via the cooperation unit 105, and with this, redesign is performed.

Figure 20:
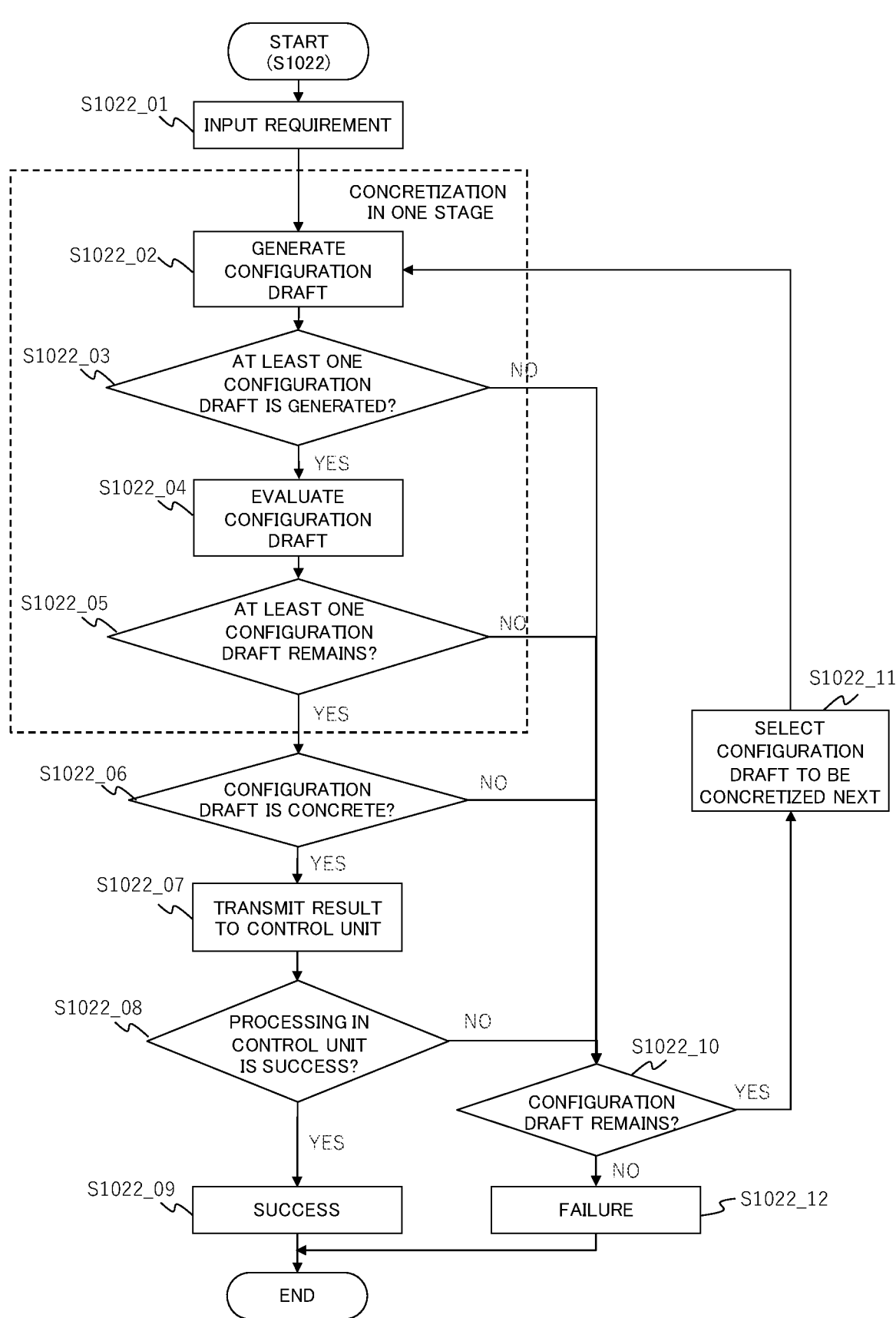
FIG. 20 is a flowchart illustrating the own domain design processing (S1022 in FIG. 19) performed by the design unit in the first example embodiment.

FIG. 20 is a flowchart illustrating the own domain design processing (S1022 in FIG. 19) performed by the design unit 103 in the first example embodiment. First, the design unit 103 receives a system requirement for the own domain from the control unit 102 (step S1022_01).

The design unit 103, with respect to abstract parts of the system requirement and portions regarding which the dependent configuration is not satisfied, replaces the parts with parts of the type that is more concrete, or supplements the dependent configuration based on the constituent element type information 107 recorded in the storage unit 106. Accordingly, the design unit 103 generates a configuration that is concretized one step further (step S1022_02). Here, a plurality of configuration ideas are generated as candidates, due to differences in constituent element to be operated, differences in type to be replaced, and differences in dependent configuration to be supplemented.

Next, the design unit 103 determines whether or not at least one configuration draft has been generated in step S1022_02 (step S1022_03). If it is determined that no configuration drafts have been generated (step S1022_03: NO), the design unit 103 performs the processing in step S1022_10.

If it is determined that at least one configuration draft has been generated (step S1022_03: YES), the design unit 103 evaluates the appropriateness or prospectivity of each configuration draft (step S1022_04). The design unit 103 determines that a configuration draft that does not satisfy the constraint condition does not have appropriateness, and discards the configuration draft.

Next, the design unit 103 determines whether or not at least one appropriate configuration draft remains as a result of the evaluation (step S1022_05). If it is determined that no appropriate configuration drafts remain (step S1022_05: NO), the design unit 103 performs the processing in step S1022_10.

If it is determined that at least one appropriate configuration draft remains (step S1022_05:YES), the design unit 103 performs the following processing. That is, the design unit 103 determines whether or not, in the appropriate configuration drafts, a configuration draft in which all constituent elements are concrete and a dependent configuration is satisfied, that is, a concrete system configuration, is present (step S1022_06). If it is determined that a concrete system configuration has not been found (step S1022_06: NO), the design unit 103 performs the processing in step S1022_10.

If it is determined that a concrete system configuration has been found (step S1022_06: YES), the design unit 103 performs the following processing. That is, the design unit 103 transmits the concrete system configuration that has been found to the control unit 102 as the design result, and waits for a completion notification from the control unit 102 (step S1022_07).

Next, the design unit 103 determines whether the content of the notification from the control unit 102 indicates a success, that is, the design is a success in all of the other domains, or a failure, that is, design is a failure in at least one other domain (step S1022_08). If it is determined that the content of the notification from the control unit 102 indicates a failure (step S1022_08: NO), the design unit 103 performs the processing in step S1022_10.

If it is determined that the content of the notification from the control unit 102 indicates a success (step S1022_08: YES), the design unit 103 determines that the design is a success, and ends the processing (step S1022_09).

If it is determined NO in step S1022_03, NO in step S1022_05, NO in step S1022_06, and NO in step S1022_08, the design unit 103 performs the following processing. That is, the design unit 103 determines whether or not a configuration draft that is to be concretized further still remains (step S1022_10).

If it is determined that a configuration draft still remains (step S1022_10: YES), the design unit 103 performs the following processing. That is, the design unit 103 selects a configuration draft that is to be concretized next based on the evaluation result on the configuration draft regarding prospectivity (step S1022_11). The design unit 103 performs generation of a configuration draft that is further concretized based on the selected configuration draft (the processing is returned to step S1022_02).

If it is determined that no configuration drafts remain (step S1022_10: NO), the design unit 103 notifies the control unit 102 of a design failure (step S1022_12), and ends the processing. When notifying the control unit 102 of a design failure (step S1022_12), the design unit 103 may send a design result in which a fact of design failure is written to the control unit 102. Here, if the causal factor of design failure is a restriction such as a resource amount of the own domain or a performance value, the design unit 103 may add the restriction to the design result as a constraint condition.

Note that the cooperation unit 105 may change the content of the system requirement based on a determined rule, and transmit the changed system requirement to another domain of which design is to be requested. Accordingly, the automatic design apparatus in the other domain that has been received a request can perform the design processing based on the changed system requirement.

Effects of First Example Embodiment

According to the first example embodiment, design of the configuration of an information communication system based on a requirement, with respect to a configuration in which the system utilizes resources extending across a plurality of independent domains as well, can be appropriately performed while taking resource situations of the domains into consideration. That is a system extending across a plurality of domains administered by different administrators can be automatically and appropriately designed.

[Program]

The program according to the first example embodiment may be a program that causes a computer to execute the processes described in FIGS. 18, 19 and 20. By installing this program in a computer and executing the program, the automatic design apparatus 100 and the information processing method according to the first example embodiment can be realized. Further, the processor of the computer performs processing to function as the input/output unit 101, a control unit 102, a design unit 103, a requirement extracting unit 104 and a cooperation unit 105.

Also, the program according to the first example embodiment may be executed by a computer system constructed by a plurality of computers. In this case, for example, each computer may function as any of the input/output unit 101, a control unit 102, a design unit 103, a requirement extracting unit 104 and a cooperation unit 105.

In the first example embodiment, the storage unit 106 may be realized by storing the data files that comprise them in a hard disk or other storage device provided in a computer, or it may be realized by a storage device in another computer.

Second Example Embodiment

The second example embodiment is a mode in which automated design is performed, in cooperation, by adjusting domain definition information in each domain as appropriate. The automatic design apparatus receives requirements from a plurality of users, and therefore it is conceivable that, as a result of a change in the amount of resources requested by one user, the amount of resources that can be further requested by another user changes.

Assume that, in such a case, taking the amount of resources that a certain domain X can provide into consideration in advance as a constraint condition, another domain Y that uses the domain X can design a system configuration. In this case, wasteful processing in which requests that cannot be accepted by the domain X are extracted and requested can be avoided.

The second example embodiment is a mode in which, in view of the aforementioned object, the constraint conditions regarding requirements that can be accepted by each domain are shared via a shared storage unit. The configuration of an automatic design apparatus in the second example embodiment will be described below.

[System Configuration]

Figure 21:
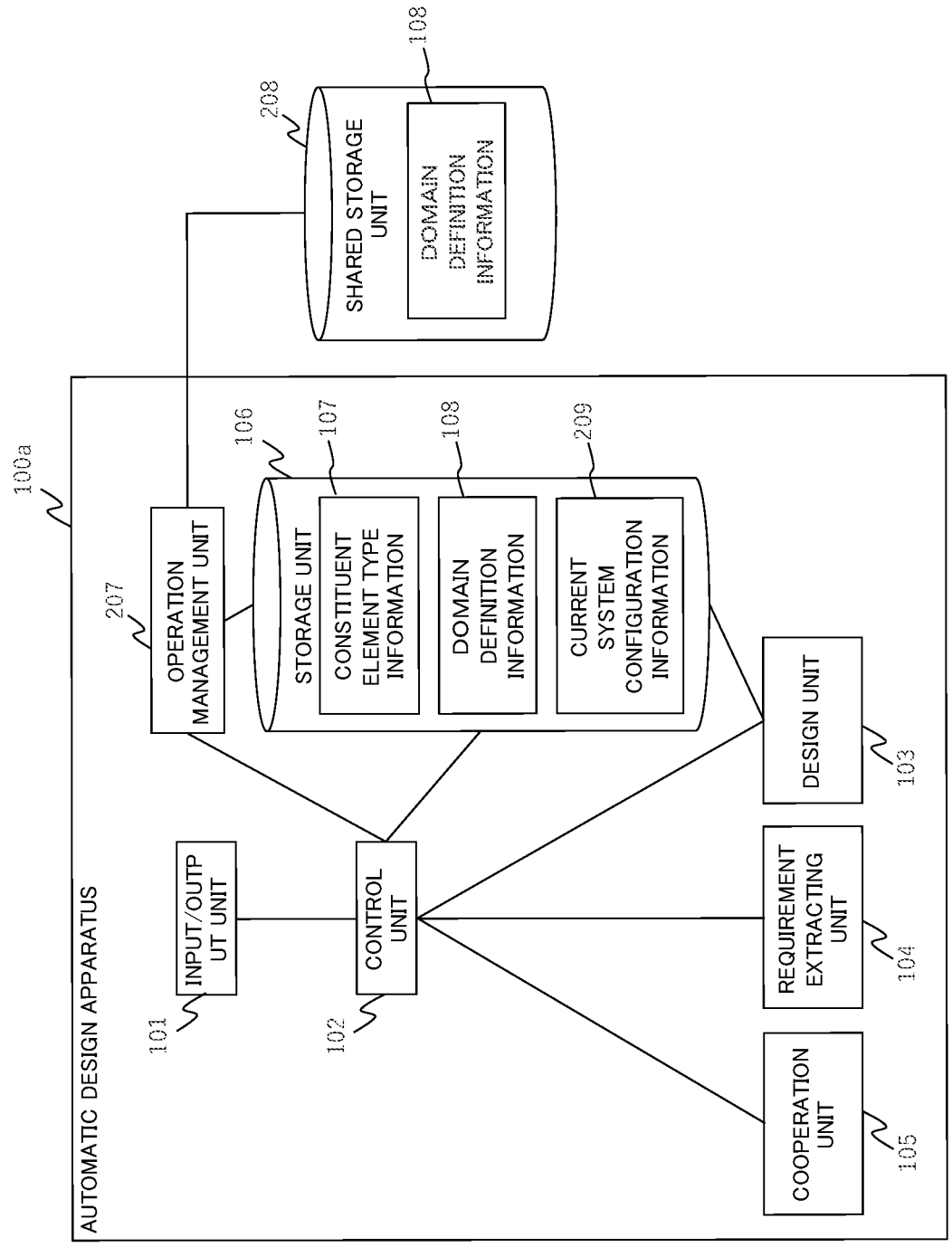
FIG. 21 is a block diagram illustrating the functional configuration of the automatic design apparatus in the second example embodiment.

FIG. 21 is a block diagram illustrating the functional configuration of the automatic design apparatus in the second example embodiment. In FIG. 21, constituent elements that are similar to those in the first example embodiment are given the same reference signs and the description thereof will be omitted. The automatic design apparatus 100a in the second example embodiment further includes an operation management unit 207 and an external shared storage unit 208.

The operation management unit 207 is communicably connected to the control unit 102, the storage unit 106, and the shared storage unit 208. The operation management unit 207 has a function of recording domain definition information 108 to the shared storage unit 208 and a function of recording the domain definition information 108 to the storage unit 106. When the domain definition information 108 is recorded to the shared storage unit 208, the operation management unit 207 creates, based on an instruction from the control unit 102, domain definition information 108 regarding the own domain from the information stored in the storage unit 106, and records the domain definition information 108 in the shared storage unit 208. When the domain definition information 108 is recorded to the storage unit 106, the operation management unit 207 acquires, based on a notification from the shared storage unit 208, domain definition information 108 regarding another domain from the shared storage unit 208, and records the domain definition information 108 in the storage unit 106.

Also, the input/output unit 101 further has a function of receiving a construction request of a designed system. The control unit 102 further has a function of constructing a designed system. The storage unit 106 has a function of further recording information (current system configuration information) 209 regarding a current constructed system configuration.

Figure 22:
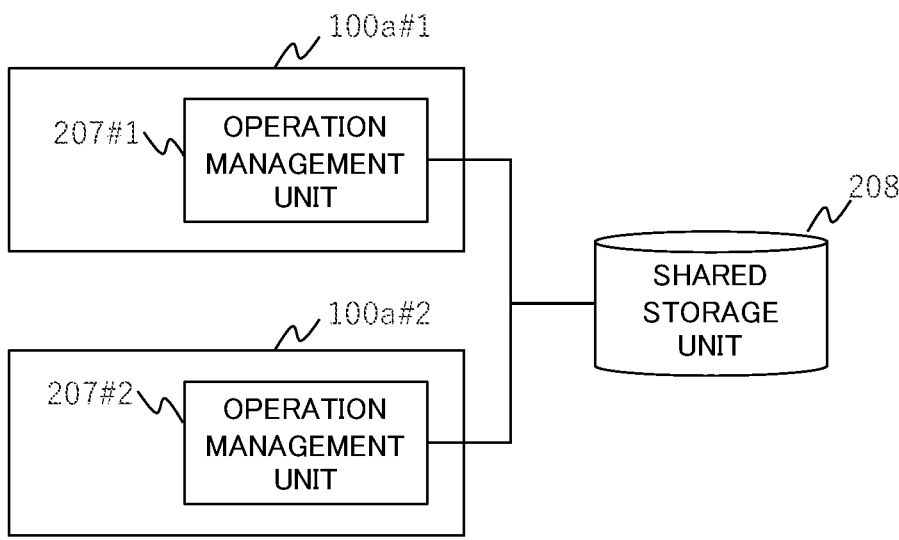
FIG. 22 is a block diagram illustrating an overall configuration of a hierarchized automatic design apparatus group in the second example embodiment.

FIG. 22 is a block diagram illustrating an overall configuration of a hierarchized automatic design apparatus group in the second example embodiment. As shown in FIG. 22, the automatic design apparatus in the second example embodiment is divided into a plurality of domains. The operation management units 207 (207#1, 207#2) of the automatic design apparatuses 100a (100a#1, 100a#2) in the respective domains are communicably connected to the shared storage unit 208.

Next, data to be used by the automatic design apparatus 100a in the second example embodiment will be described. FIG. 23 is a diagram illustrating an example of current system configuration information 209 recorded in the storage unit 106, in the second example embodiment. As shown in FIG. 23, the current system configuration information 209 includes "intents", "history", and "instance". "intents" is an array of a plurality of received system requirements.

"history" is an array indicating the history of concretization when the system requirements are designed. "history" is information corresponding to the flow from (A) to (G) illustrated in FIG. 7. One element in the "history" array indicates concretization in one stage, and is constituted by pieces of information, namely "eid", "rule_id", "map", and "new_map".

"eid" indicates id of a constituent element to be concretized. "rule_id" indicates content of applied concretization. "Cloud_VM_basic" in the example in FIG. 23 indicates that concretization is applied in which a dependent configuration is complemented by applying "expect" named "basic" that is defined in a Cloud_VM type.

"map" and "new_map" each describe correspondence between constituent elements in a configuration draft and constituent elements described in "expect" of a type. "new_map" is used when after a new constituent element is generated in a configuration draft, the new constituent element is associated with a constituent element described in "expect" of a type.

"new_map" in the example in FIG. 23 indicates that a new constituent element in the Cloud_1 type is generated in a configuration draft, as a constituent element corresponding to "iaas" in "expect" named basic above, and is assigned id of "iaas_01-001".

"instance" represents "topology" of a configuration that is a system configuration, which is a design result, and is obtained by construction and substantialization. The configuration has been constructed, and therefore the states of respective constituent elements are recorded therein, and are all "running" in the example in FIG. 23.

The information in "history" is used to perform redesign, when redesign is performed by modifying requirements in a situation in which a current configuration is already present, while following the current configuration as long as possible.

Next, the message when the operation management unit 207 registers information in the shared storage unit 208, and the response message when, conversely, the operation management unit 207 reads out information from the shared storage unit 208 will be described.

FIG. 24 is a diagram illustrating an example of input and output information of the shared storage unit 208 in the second example embodiment. (A) in FIG. 24 is an example of the message when the operation management unit 207 registers information in the shared storage unit 208. The content in (A) in FIG. 24 is the domain definition information 108 of the own domain.

(B) in FIG. 24 is an example of the response message from the shared storage unit 208 when the operation management unit 207 reads out information from the shared storage unit 208. The content in (B) in FIG. 24 is an array in which pieces of domain definition information (portion in boldface) 108 of a plurality of related other domains are collected.

Figure 25:
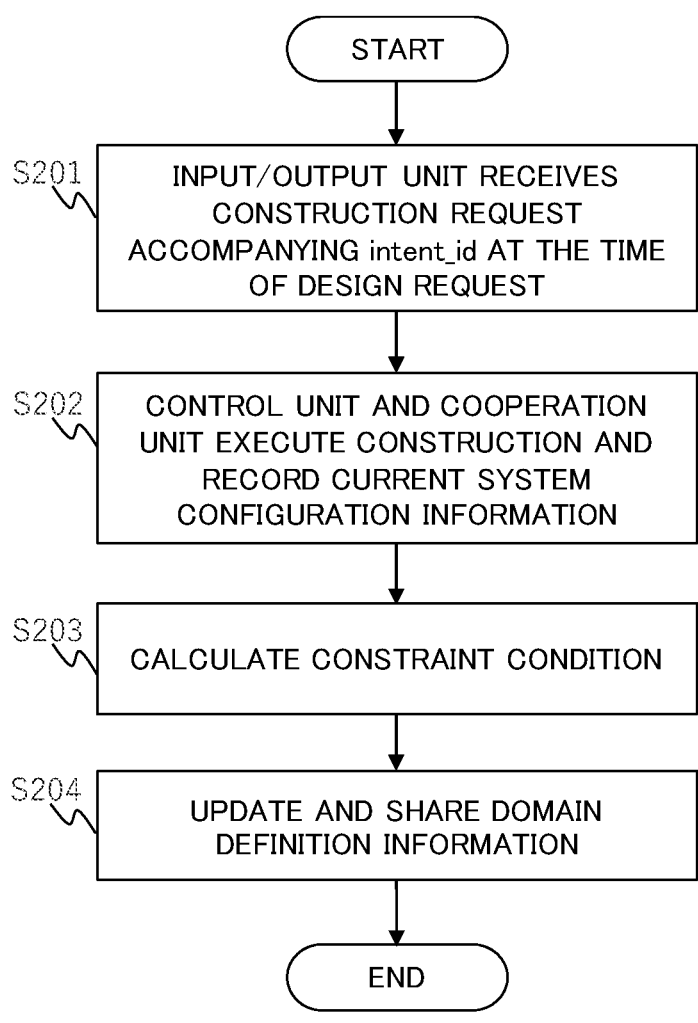
FIG. 25 is a flowchart illustrating the operations of the automatic design apparatus when the domain definition information of the own domain is updated, in the second example embodiment.

Next, the operations of the automatic design apparatus 100a in the second example embodiment will be described. FIG. 25 is a flowchart illustrating the operations of the automatic design apparatus 100a when the domain definition information 108 of the own domain is updated, in the second example embodiment. The operations of the automatic design apparatus 100a in the second example embodiment includes an operation of updating the domain definition information 108 by reexamining the constraint conditions and an operation of updating information in the storage unit 106 by acquiring the domain definition information 108 of another domain, in addition to performing construction after receiving a construction request.

Note that the automatic design apparatus 100a in the second example embodiment gives "intent_id" as an identifier of each design request when requesting another domain to perform design, and uses the given "intent_id" in the aforementioned operations.

First, the input/output unit 101 receives a construction request accompanying "intent_id" at the time of design request (step S201).

Next, the control unit 102 and cooperation unit 105 construct a system based on a system configuration based on a request having "intent_id", and record the system configuration in the storage unit 106 as current system configuration information 209 (step S202).

Next, the control unit 102 calculates a constraint condition based on the updated current system configuration information 209 (step S203). When calculating a constraint condition, a calculation method may be set in advance. For example, the method of calculating a constraint condition regarding the number of VMs included in an acceptable system requirement may be a calculation method in which the number of physical machines that are included in the current system configuration information 209 and to which a VM has not been assigned is calculated, and the calculated number is the acceptable number of the VMs.

Next, the operation management unit 207 updates the domain definition information 108 of the own domain with the calculated constraint condition, and transmits the updated domain definition information 108 to the shared storage unit 208 (step S204). The shared storage unit 208 records the received domain definition information 108.

Figure 26:
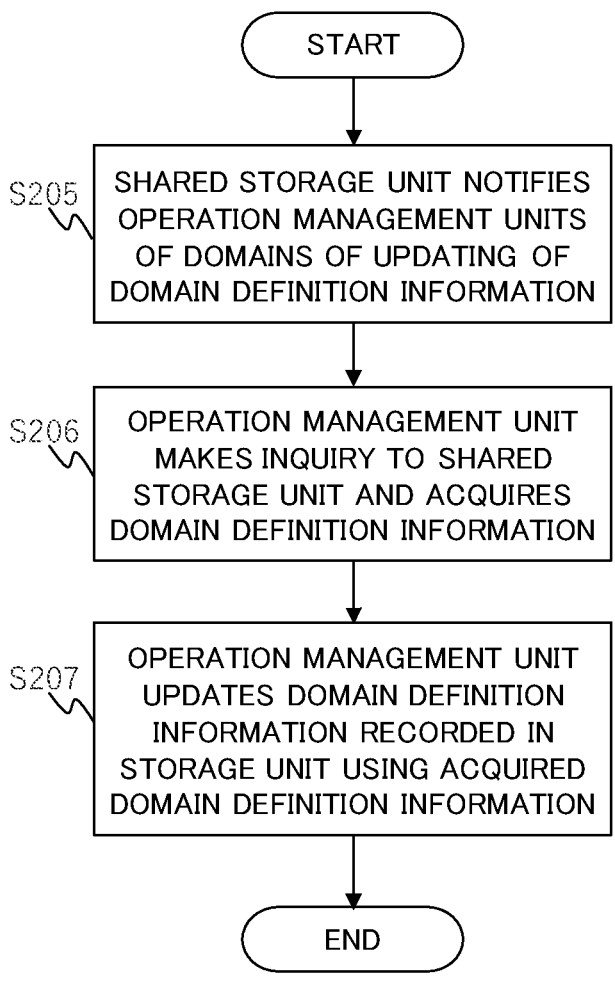
FIG. 26 is a flowchart illustrating the operations of the automatic design apparatus when the domain definition information of another domain is updated in the second example embodiment.

FIG. 26 is a flowchart illustrating the operations of the automatic design apparatus 100a when the domain definition information 108 of another domain is updated in the second example embodiment. The shared storage unit 208 notifies the operation management units 207 of the respective domains of updating of domain definition information 108, when an update request of domain definition information 108 is received from the domains (step S205).

Upon receiving an update notification of domain definition information 108 from the shared storage unit 208, the operation management unit 207 makes an inquiry to the shared storage unit 208 at any timing, and acquires the updated domain definition information 108 from the shared storage unit 208 (step S206).

The operation management unit 207 updates the corresponding domain definition information 108 recorded in the storage unit 106 in the own domain using the acquired domain definition information 108 (step S207).

Effects of Second Example Embodiment

According to the second example embodiment, constraint conditions regarding system requirements that can be accepted by the other domains can be shared in advance. Accordingly, generation of a requirement and transmission of a design request for which it is already understood that design will fail can be prevented in advance, and the efficiency of the entire processing can be improved.

[Program]

The program according to the second example embodiment may be a program that causes a computer to execute the processes described in FIG. 25. By installing this program in a computer and executing the program, the automatic design apparatus 100a and the information processing method according to the second example embodiment can be realized. Further, the processor of the computer performs processing to function as the input/output unit 101, a control unit 102, a design unit 103, a requirement extracting unit 104, a cooperation unit 105 and the operation management unit 207.

Also, the program according to the second example embodiment may be executed by a computer system constructed by a plurality of computers. In this case, for example, each computer may function as any of the input/output unit 101, a control unit 102, a design unit 103, a requirement extracting unit 104, a cooperation unit 105 and the operation management unit 207.

In the first example embodiment, the storage unit 106 may be realized by storing the data files that comprise them in a hard disk or other storage device provided in a computer, or it may be realized by a storage device in another computer.

In the first example embodiment, the shared storage unit 208 may be realized by storing the data files that comprise them in a hard disk or other storage device provided in a computer, or it may be realized by a storage device in another computer.

Third Example Embodiment

The third example embodiment is a mode in which transaction management is performed in cooperation between domains. It is conceivable that, if a plurality of requests are processed in parallel when a plurality of domains perform design in cooperation with each other, and a system is constructed based on the design result, a contradiction such as a failure in constructing a system configuration that is regarded as a success in design occurs. On the other hand, if a configuration is adopted in which requests are only serially processed in the entirety of a plurality of domains, such a contradiction can be prevented, but the throughput of the overall processing decreases.

It is known in general that similar problems occur when data is referenced and updated in a database management system (DBMS), and transaction management is used in order to deal with such problems.

"Transaction" is an idea that the result generated in a certain request is provisionally reserved, and the reserved state is taken into consideration when another request is processed. The state that is generated after the transaction is started is committed or rollbacked in a certain period of time. When committed, the provisionally reserved state is lastingly decided, and when rollbacked, the provisionally reserved state is canceled.

According to the transaction management, the range in which a plurality of requests can only be processed serially in the entirety of a plurality of domains can be limited to a portion that has been changed in the transaction. Therefore, a reduction in throughput of overall processing can be suppressed while preventing a contradiction in processing results.

[System Configuration]

The third example embodiment is a mode in which the idea described above is imported to an automatic design apparatus. The configuration of the automatic design apparatus in the third example embodiment is similar to the configuration in the second example embodiment, and therefore the description thereof is omitted. Note that a reference sign 100b is attached to the automatic design apparatus in the third example embodiment, for the sake of description.

FIG. 27 is a diagram illustrating an example of current system configuration information 209 recorded in the storage unit 106 in the third example embodiment. In FIG. 27, descriptive sentences that need to be paid attention are denoted in boldface.

In the third example embodiment, when the requests are managed in the transaction management, "transaction_id" is given to the current system configuration information 209 shown in FIG. 23. Also, constituent elements included in the current system configuration information 209 can take "reserved" indicating provisionally reserved state as the value of "state". Here, when a constituent element is managed in the transaction management, the constituent element retains "transaction_id". In the example in FIG. 27, with respect to a requirement having "intent_id" of "001", "00a" is given as "transaction_id". Each element in "instance" retains "00a" as "transaction_id".

FIG. 28 is a diagram illustrating an example of the message regarding a design request by a cooperation unit 105 in the third example embodiment. (A) in FIG. 28 is an example of the design request message to be notified at the time of design request. (B) in FIG. 28 shows an example of a commit message indicating that a transaction is committed. (C) in FIG. 28 shows an example of a rollback message indicating that a transaction is rollbacked.

In (A) in FIG. 28, "transaction" indicates whether or not the transaction is managed in this request. Specifically, if the value of "transaction" is "true", the transaction is managed, and if the value of "transaction" is "false", the transaction is not managed.

"transaction_id" is an identifier designating which of the transactions is to be committed or rollbacked when committed or rollbacked later, when the transaction is managed.

In (B) and (C) in FIG. 28, "transaction" indicates the operation (commit or rollback) to be performed. (B) in FIG. 28 indicates the operation to be performed is to commit. (C) in FIG. 28 indicates that the operation to be performed is to rollback. Also, in (B) and (C) in FIG. 28, "transaction_id" indicates the identifier of transaction to be committed or rollbacked.

Figure 29:
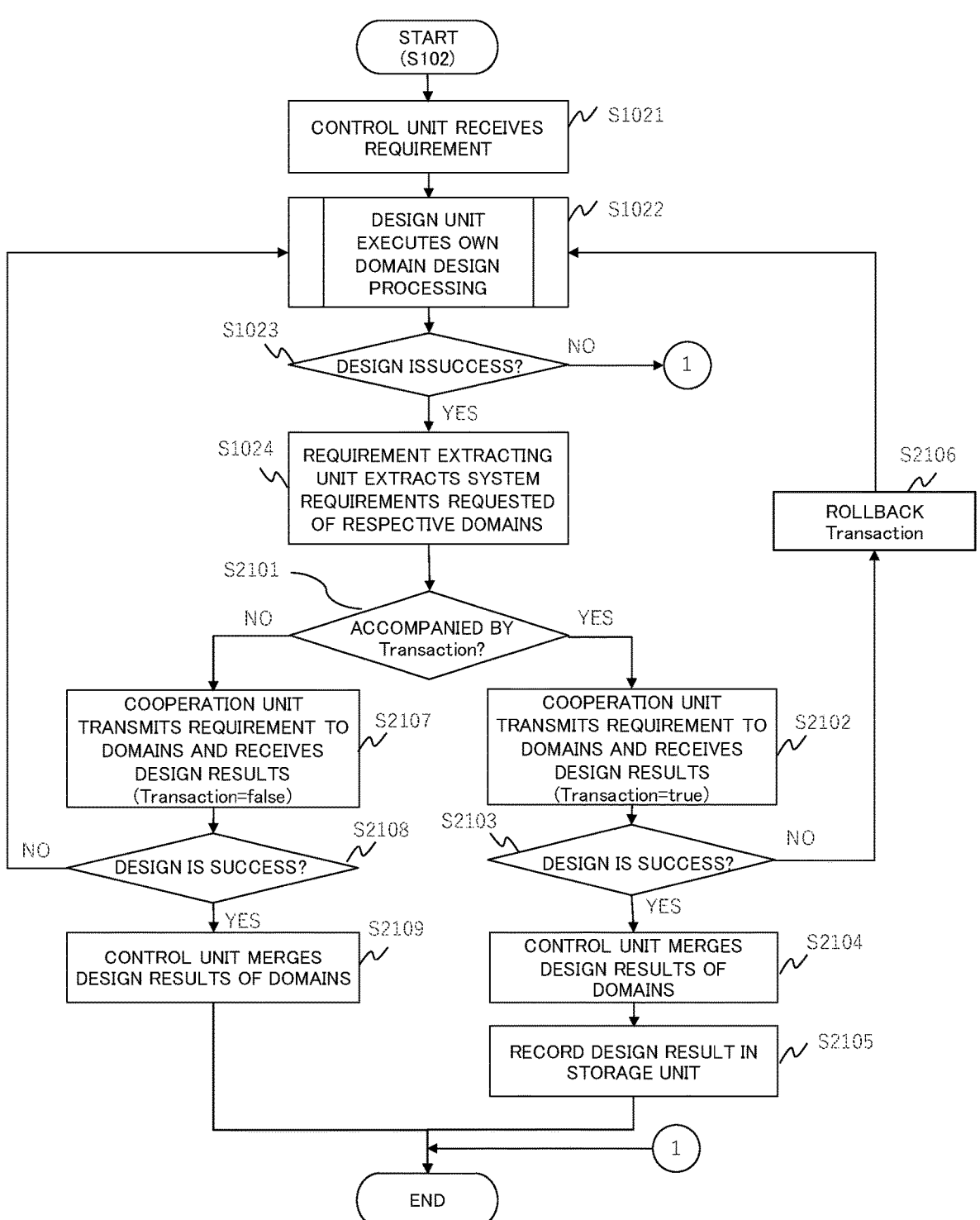
FIG. 29 is a flowchart illustrating the operations of the automatic design apparatus in the third example embodiment.

Next, the operations of the automatic design apparatus in the third example embodiment will be described. FIG. 29 is a flowchart illustrating the operations of the automatic design apparatus 100b in the third example embodiment. The flowchart in FIG. 29 is obtained by replacing the processing in steps S1025 to S1027 in the flowchart in FIG. 19 with the processing in steps S2101 to S2109.

The basic operations of the automatic design apparatus 100b in the third example embodiment are similar to the operations of the automatic design apparatus 100 in the first example embodiment, and similar portions are given the same reference signs and detailed description thereof will be omitted.

The control unit 102 in the third example embodiment receives system requirements extracted by the requirement extracting unit 104 in step S1024. The control unit 102 determines, before transmitting the received system requirements to the cooperation unit 105, whether or not the design request that causes the processing is accompanied by transaction based on the design request message illustrated in (A) in FIG. 28 (step S2101). Note that when the control unit 102 is a control unit 102 of the automatic design apparatus 100b in the uppermost-level domain, a user may also give an attribute of transaction:true when inputting a system requirement corresponding to that in (B) in FIG. 9, for example.

If it is determined that the design request message accompanies transaction (step S2101:YES), the control unit 102 performs the following processing. That is, when the cooperation unit 105 requests other domains to perform design, as described in step S1025 in FIG. 19, the control unit 102 creates a design request message in which transaction is true and to which a unique transaction_id is given as appropriate. The cooperation unit 105 transmits the design request message to the domains. The cooperation unit 105 receives design results corresponding to the requested design from the domains, and transmits, as a response, the design results to the control unit 102 (step S2102).

Next, the control unit 102 determines whether or not the requested design in each domain is successful (step S2103). If it is determined that the requested design in each domain is successful (YES in step S2103), the control unit 102 merges the design results of the domains (step S2104), similarly to the first example embodiment. The control unit 102 records the design results in the storage unit 106 in association with transaction_id and reserved state (step S2105).

If it is determined that the requested design in the domains has failed (step S2103:NO), the control unit 102 performs the following processing. That is, the control unit 102 rollbacks the transaction by transmitting a transaction rollback message (FIG. 28 (C)) to the requested domains along with the aforementioned transaction_id via the cooperation unit 105 (step S2106). Then, the control unit 102 again performs design (returns the processing to step S1022).

If it is determined that the design request message does not accompany transaction (step S2101:NO), control unit 102 performs the following processing. That is, when the cooperation unit 105 requests the other domains to perform design, the control unit 102 creates a design request message in which "transaction" is false. The cooperation unit 105 transmits the design request message to the domains. The cooperation unit 105 receives design results corresponding to the requested design from the domains, and transmits the design results to the control unit 102 (step S2107).

The following two steps (step S2108, S2109) are similar to the steps (step S2103, S2104) when transaction is accompanied, and therefore the description thereof will be omitted.

Figure 30:
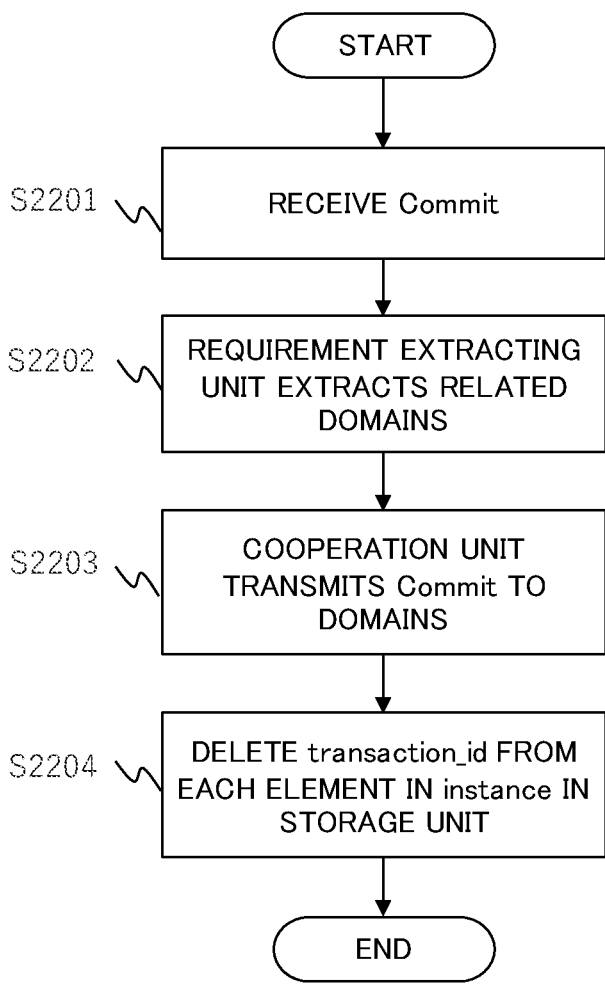
FIG. 30 is a flowchart illustrating the operations of the automatic design apparatus 100*b* that has received a commit message in the third example embodiment.

FIG. 30 is a flowchart illustrating the operations of the automatic design apparatus 100b that has received a commit message in the third example embodiment. When design is successful in a domain that is an origin of a series of design requests extending across a plurality of domains, the automatic design apparatus 100b in the third example embodiment performs the following processing, at the timing in which the control unit 102 records the design results in the storage unit 106 (after step S2105 in FIG. 29). That is, the automatic design apparatus 100b transmits a commit message accompanying transaction_id illustrated in (B) in FIG. 28 to the requested domains via the cooperation unit 105. With this, the automatic design apparatus 100b that has transmitted the commit message finalizes the design results. In the automatic design apparatuses 100b that have received the commit message, the input/output unit 101 in each domain receives the commit message (step S2201).

The requirement extracting unit 104 extracts, from the current system configuration information 209 recorded in the storage unit 106, domains that include constituent elements related to the transaction, and transmits, as a response, the extracted domains to the control unit 102 (step S2202).

The control unit 102 transmits a commit message along with transaction_id to the extracted domains via the cooperation unit 105 (step S2203).

The control unit 102 deletes transaction_id and "state" from each constituent element in the current system configuration information 209 recorded in the storage unit 106 in order to finalize the states of the constituent elements, in the own domain, related to the transaction (step S2204).

Figure 31:
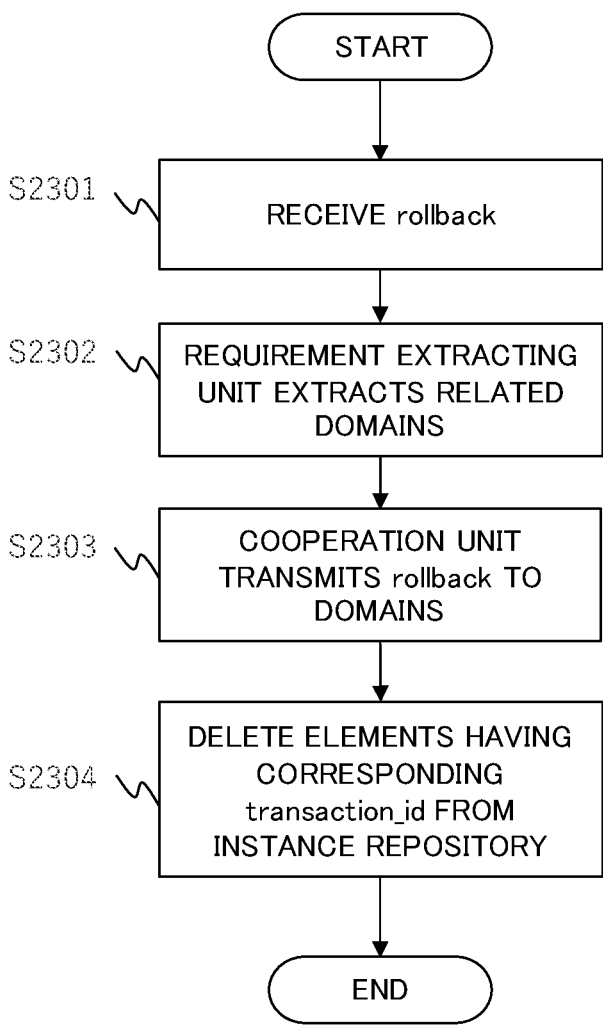
FIG. 31 is a flowchart illustrating the operations of the automatic design apparatus 100*b* that has received a rollback message in the third example embodiment.

FIG. 31 is a flowchart illustrating the operations of the automatic design apparatus 100b that has received a rollback message in the third example embodiment. The automatic design apparatus 100b in the third example embodiment rollbacks the transaction when design is failed in the domains (step S2106 in FIG. 29). That is, in the automatic design apparatus 100b, the control unit 102 transmits a rollback message accompanying transaction_id illustrated in (C) in FIG. 28 to the requested domains via the cooperation unit 105. In the automatic design apparatuses 100b that have received the rollback message, the input/output unit 101 in each domain receives the rollback message (step S2301).

The requirement extracting unit 104 extracts, from the current system configuration information 209 recorded in the storage unit 106, domains including constituent elements related to the transaction, and transmits, as a response, the extracted domains to the control unit 102 (step S2302).

The control unit 102 transmits a rollback message along with its transaction_id to the extracted domains via the cooperation unit 105 (step S2303).

The control unit 102 deletes the constituent element having transaction_id from the current system configuration information 209 recorded in the storage unit 106 in order to cancel the states of the constituent elements, in the own domain, related to the transaction (step S2304).

Effects of Third Example Embodiment

According to the third example embodiment, the design across a plurality of domains can be performed highly efficiently without contradiction.

[Program]

The program according to the third example embodiment may be a program that causes a computer to execute the processes described in FIGS. 29, 30 and 31. By installing this program in a computer and executing the program, the automatic design apparatus 100*b* and the information processing method according to the third example embodiment can be realized. Further, the processor of the computer performs processing to function as the input/output unit 101, a control unit 102, a design unit 103, a requirement extracting unit 104, a cooperation unit 105 and the operation management unit 207.

Also, the program according to the third example embodiment may be executed by a computer system constructed by a plurality of computers. In this case, for example, each computer may function as any of the input/output unit 101, a control unit 102, a design unit 103, a requirement extracting unit 104, a cooperation unit 105 and the operation management unit 207.

In the third example embodiment, the storage unit 106 may be realized by storing the data files that comprise them in a hard disk or other storage device provided in a computer, or it may be realized by a storage device in another computer.

In the third example embodiment, the shared storage unit 208 may be realized by storing the data files that comprise them in a hard disk or other storage device provided in a computer, or it may be realized by a storage device in another computer.

[Physical Configuration]

Figure 32:
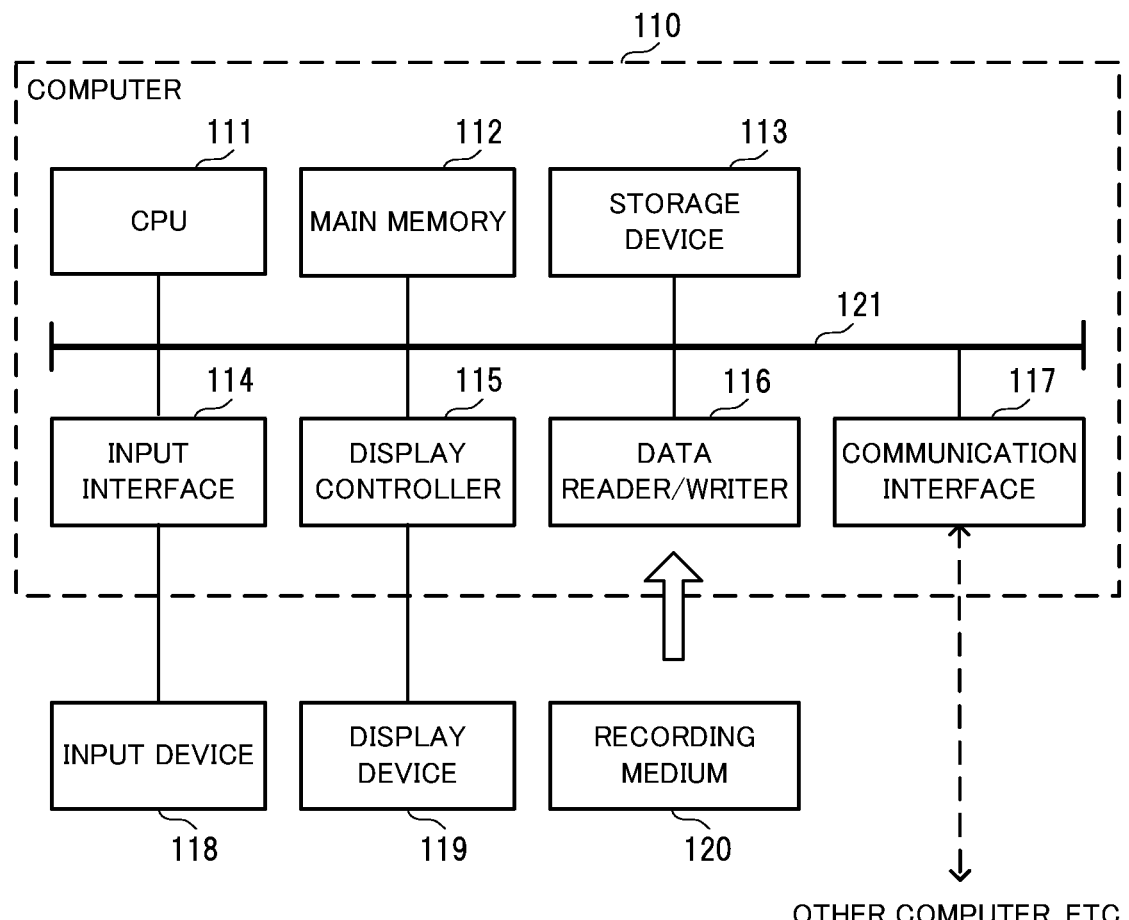
FIG. 32 is a diagram illustrating an example of a computer that realizes the automatic design apparatus in the first, second and third example embodiments.

A computer that realizes an automatic design apparatus 100, 100*a* and 100*b* by executing the program according to the first, second and third example embodiments will be described with reference to FIG. 32. FIG. 32 is a block diagram showing an example of a computer that realizes the information processing apparatus according to the first, second and third example embodiments.

As shown in FIG. 32, a computer 1110 includes a CPU 1111, a main memory 1112, a storage device 1113, an input interface 1114, a display controller 1115, a data reader/writer 1116, and a communication interface 1117. These units are connected via bus 1121 so as to be able to perform data communication with each other. Note that the computer 1110 may include a GPU or a FPGA in addition to the CPU 1111 or instead of the CPU 1111.

The CPU 1111 loads a program (codes) according to the first, second and third example embodiments stored in the storage device 1113 to the main memory 1112, and executes them in a predetermined order to perform various kinds of calculations. The main memory 1112 is typically a volatile storage device such as a DRAM (Dynamic Random Access Memory). Also, the program according to the first and second example embodiments and the first and second working examples are provided in the state of being stored in a computer-readable recording medium 1120. Note that the program according to the first and second example embodiments and the first and second working examples may be distributed on the Internet that is connected via the communication interface 1117.

Specific examples of the storage device 1113 include a hard disk drive, and a semiconductor storage device such as a flash memory. The input interface 1114 mediates data transmission between the CPU 1111 and the input device 1118 such as a keyboard or a mouse. The display controller 1115 is connected to a display device 1119, and controls the display of the display device 1119.

The data reader/writer 1116 mediates data transmission between the CPU 1111 and the recording medium 1120, and reads out the program from the recording medium 1120 and writes the results of processing performed in the computer 1110 to the recording medium 1120. The communication interface 1117 mediates data transmission between the CPU 1111 and another computer.

Specific examples of the recording medium 1120 include general-purpose semiconductor storage devices such as a CF(Compact Flash (registered trademark)) and a SD (Secure Digital), a magnetic recording medium such as a flexible disk, and an optical recording medium such as a CD-ROM (Compact Disk Read Only Memory).

The automatic design apparatus 100, 100*a* and 100*b* according to the first, second and third example embodiments can also be realized by using hardware corresponding to each unit, for example, an electronic circuit, instead of a computer in which a program is installed. Furthermore, a part of each of the automatic design apparatus 100, 100*a* and 100*b* according to the first, second and third example embodiments may be realized by a program, and the remaining part may be realized by hardware. In the example embodiments, the computer is not limited to the computer 1110 shown in FIG. 32.

Although the invention of this application has been described with reference to the first and second example embodiments, the invention of this application is not limited to the above example embodiments. Within the scope of the invention of this application, various changes that can be understood by those skilled in the art can be made to the configuration and details of the invention of this application.

According to the technology described above, it can be applied to applications such as the design and construction of ICT systems and communication networks.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. An information processing apparatus comprising:
at least one memory storing instructions; and
at least one processor configured to execute the instructions to:
acquire target system requirement information pertaining to system requirements regarding one or more authority ranges out of system requirements pertaining to an information communication system that is to be designed and is configured across a plurality of authority ranges that are ranges in which a plurality of system design agents have authority regarding system design;
generate, from first system requirement information belonging to a first authority range out of the one or more authority ranges, first system configuration information pertaining to a system configuration belonging to the first authority range, based on the target system requirement information;
request another information processing apparatus, which is an information processing apparatus of another system design agent having authority for a second authority range that is different from the first authority range, to generate second system configuration information pertaining to a system configuration belonging to the second authority range, based on second system requirement information belonging to the second authority range out of the target system requirement information;

generate target system configuration information pertaining to a system configuration corresponding to the target system requirement information, based on the first system configuration information and the second system configuration information generated in response to the request; and output the target system configuration information to an output device.

2. The information processing apparatus according to claim 1, wherein the at least one processor is further configured to execute the instructions to:

in a case of receiving, from the other information processing apparatus, information indicating that a result of generating second system configuration information is a failure, generate the first system configuration information based on a constraint condition of the other information processing apparatus that is included in content of the failure.

3. The information processing apparatus according to claim 1, wherein the at least one processor is further configured to execute the instructions to:

store authority range definition information in which requirements regarding system configurations belonging to the plurality of authority ranges are defined; and update, in a case where first authority range definition information pertaining to the first authority range out of the authority range definition information stored is updated, information corresponding to the first authority range definition information out of the authority range definition information stored in an external storage device, with updated first authority range definition information, upon receiving a notification indicating that authority range definition information regarding an authority range other than the first authority range out of the authority range definition information has been updated from the external storage device, acquire updated authority range definition information from the external storage device, and update the authority range definition information stored with the updated authority range definition information.

4. The information processing apparatus according to claim 1, wherein the at least one processor is further configured to execute the instructions to:

in a case of requesting the other information processing apparatus to generate the second system configuration information, perform transaction management regarding the second system configuration information.

5. The information processing apparatus according to claim 1, wherein the at least one processor is further configured to execute the instructions to:

request the other information processing apparatus to generate the second system configuration information, based on types of constituent elements of system requirements respectively used in the plurality of authority ranges.

6. An information processing system including a plurality of information processing apparatuses that are configured to communicate with each other, wherein the plurality of information processing apparatuses each include:

at least one memory storing instructions; and at least one processor configured to execute the instructions to:

acquire target system requirement information pertaining to system requirements regarding one or more authority ranges out of system requirements pertaining to an information communication system that is to be designed and is configured across a plurality of authority ranges that are ranges in which a plurality of system design agents have authority regarding system design;

generate, from first system requirement information belonging to a first authority range out of the one or more authority ranges, first system configuration information pertaining to a system configuration belonging to the first authority range, based on the target system requirement information;

request another information processing apparatus, which is an information processing apparatus of another system design agent having authority for a second authority range that is different from the first authority range, to generate second system configuration information pertaining to a system configuration belonging to the second authority range, based on second system requirement information belonging to the second authority range out of the target system requirement information;

generate target system configuration information pertaining to a system configuration corresponding to the target system requirement information, based on the first system configuration information and the second system configuration information generated in response to the request; and output the target system configuration information to an output device.

7. The information processing system according to claim 6, wherein the at least one processor is further configured to execute the instructions to:

in a case of receiving, from the other information processing apparatus, information indicating that a result of generating second system configuration information is a failure update a constraint condition included in the first system requirement information according to content of the failure, and generate the first system configuration information based on the updated constraint condition.

8. The information processing system according to claim 6, further comprising:

first storage that is accessible from the plurality of information processing apparatuses, and is configured to store authority range definition information in which requirements regarding system configurations belonging to the plurality of authority ranges are defined, wherein the plurality of information processing apparatuses each include:

a second storage that stores the authority range definition information;

wherein the at least one processor is further configured to execute the instructions to update, in a case where first authority range definition information pertaining to the first authority range out of the authority range definition information stored in the second storage is updated, information corresponding to the first authority range definition information out of the authority range definition information stored in the first storage, with updated first authority range definition information, wherein the first storage is configured to transmit, to the plurality of information processing apparatuses, a notification indicating that the authority range definition information has been updated, and

wherein the at least one processor is further configured to execute the instructions to, upon receiving the notification, acquire the updated authority range definition information from the first storage, and update the authority range definition information stored with the updated authority range definition information.

9. An information processing method for a computer to carry out:

acquiring target system requirement information pertaining to system requirements regarding one or more authority ranges out of system requirements pertaining to an information communication system that is to be designed and is configured across a plurality of authority ranges that are ranges in which a plurality of system design agents have authority regarding system design;

generating, from first system requirement information belonging to a first authority range out of the one or more authority ranges, first system configuration information pertaining to a system configuration belonging to the first authority range, based on the target system requirement information;

requesting another information processing apparatus, which is an information processing apparatus of another system design agent having authority for a second authority range that is different from the first authority range, to generate second system configuration information pertaining to a system configuration belonging to the second authority range, based on second system requirement information belonging to the second authority range out of the target system requirement information;

generating target system configuration information pertaining to a system configuration corresponding to the target system requirement information, based on the first system configuration information and the second system configuration information generated in response to the request; and outputting the target system configuration information to an output device.

10. A non-transitory computer-readable recording medium that includes a program including instructions recorded thereon, the instructions causing a computer to carry out:

acquiring target system requirement information pertaining to system requirements regarding one or more authority ranges out of system requirements pertaining to an information communication system that is to be designed and is configured across a plurality of authority ranges that are ranges in which a plurality of system design agents have authority regarding system design;

generating, from first system requirement information belonging to a first authority range out of the one or more authority ranges, first system configuration information pertaining to a system configuration belonging to the first authority range, based on the target system requirement information;

requesting another information processing apparatus, which is an information processing apparatus of another system design agent having authority for a second authority range that is different from the first authority range, to generate second system configuration information pertaining to a system configuration belonging to the second authority range, based on second system requirement information belonging to the second authority range out of the target system requirement information;

generating target system configuration information pertaining to a system configuration corresponding to the target system requirement information, based on the first system configuration information and the second system configuration information generated in response to the request; and outputting the target system configuration information to an output device.

* * * * *